United States Patent [19]
Eguchi et al.

[11] Patent Number: 5,530,336
[45] Date of Patent: *Jun. 25, 1996

[54] BATTERY PROTECTION CIRCUIT

[75] Inventors: Yasuhito Eguchi, Kanagawa; Hitoshi Okada, Chiba; Kanji Murano, Tokyo; Akira Sanpei, Fukushima, all of Japan

[73] Assignee: Sony Corporation, Tokyo, Japan

[ * ] Notice: The term of this patent shall not extend beyond the expiration date of Pat. No. 5,304,915.

[21] Appl. No.: 118,633

[22] Filed: Sep. 10, 1993

[30] Foreign Application Priority Data

Sep. 17, 1992 [JP] Japan .................... 4-274946
Sep. 17, 1992 [JP] Japan .................... 4-274947

[51] Int. Cl.$^6$ .................................... H01M 10/44
[52] U.S. Cl. .................... 320/5; 320/9; 320/40; 320/29
[58] Field of Search ............... 320/5, 9, 13, 29, 320/15, 30, 40

[56] References Cited

U.S. PATENT DOCUMENTS

| | | | |
|---|---|---|---|
| 4,086,525 | 4/1978 | Ibsen et al. | 320/33 |
| 4,237,385 | 12/1980 | Jurgens et al. | 307/66 |
| 4,238,721 | 12/1980 | DeLuca et al. | 320/18 |
| 4,595,872 | 6/1986 | Ball | 320/13 |
| 4,716,354 | 12/1987 | Hacker | 320/39 |
| 4,816,736 | 3/1989 | Dougherty et al. | 320/17 |
| 4,965,738 | 10/1990 | Bauer et al. | 364/483 |
| 5,028,858 | 7/1991 | Schnizler et al. | 320/2 |
| 5,304,915 | 4/1994 | Sanpei et al. | 320/14 |

FOREIGN PATENT DOCUMENTS

| | | | |
|---|---|---|---|
| 488426 | 6/1992 | European Pat. Off. | H02J 7/02 |
| 512340 | 11/1992 | European Pat. Off. | H02J 7/00 |
| 0525744A1 | 2/1993 | European Pat. Off. | H02J 7/10 |
| 9100623 | 1/1991 | WIPO . | |
| 9308629 | 4/1993 | WIPO | H02J 7/10 |
| 9310589 | 5/1993 | WIPO | H02J 7/00 |

*Primary Examiner*—Robert Nappi
*Attorney, Agent, or Firm*—Jay H. Maioli

[57] ABSTRACT

A battery protection circuit has a condition detecting circuit which detects a voltage across a secondary cell or cells and compares the detected voltage with a reference voltage to detect an overdischarged condition or an overcharged condition of the secondary cell or cells. A control unit controls a first switching element for cutting off a discharging current and a second switching element for cutting off a charging current based on a detected condition of the secondary cell or cells. A third switch element cuts off electric power supplied to the condition detecting circuit. The third switch element is rendered nonconductive when the overdischarged condition is detected by the condition detecting circuit.

6 Claims, 25 Drawing Sheets

FIG. 3(A)
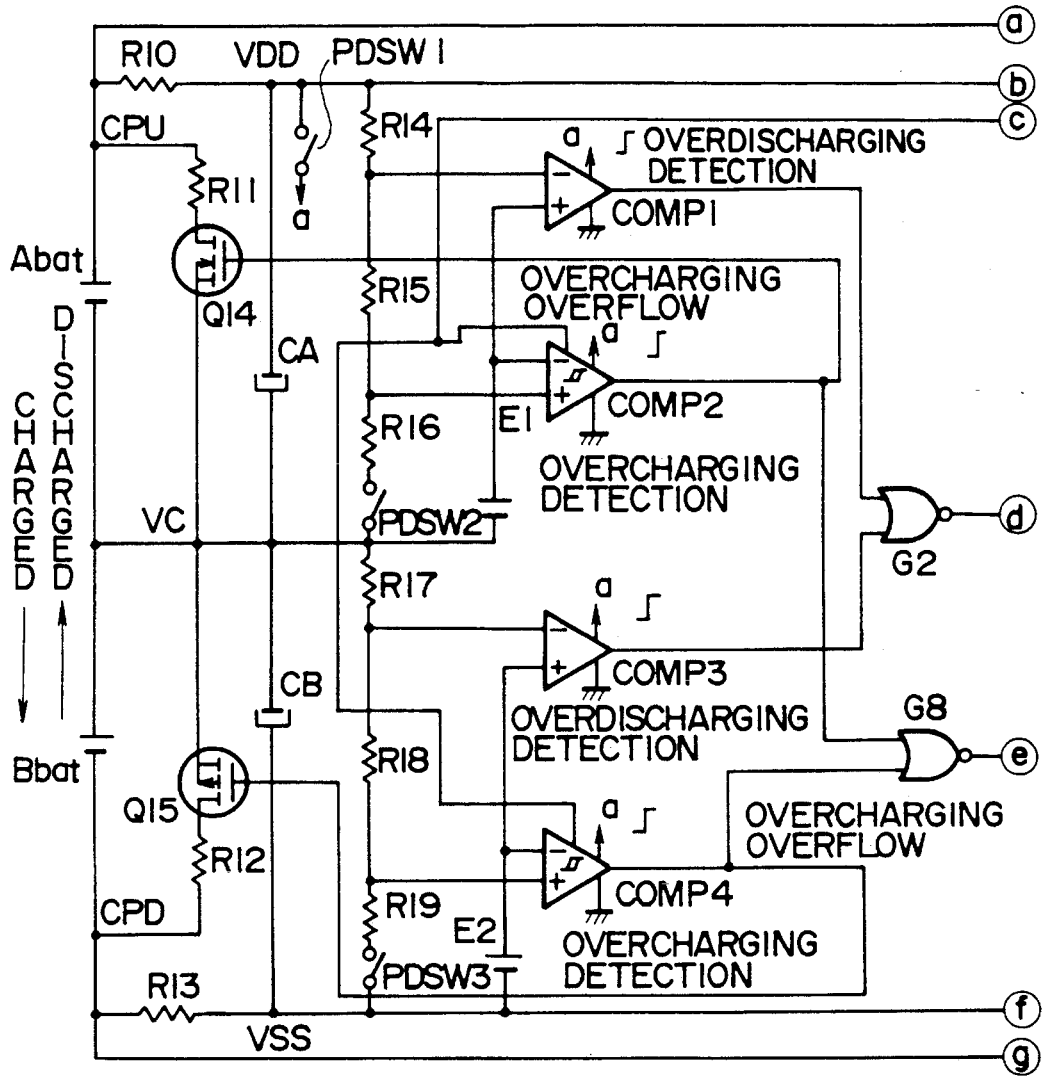
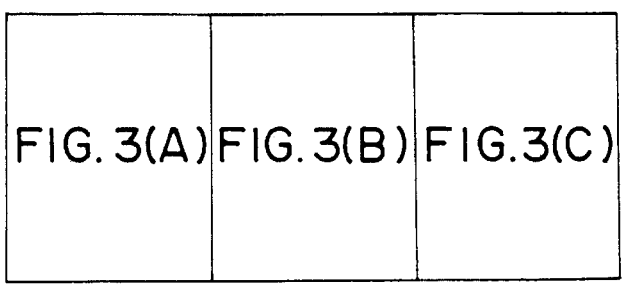

FIG. 4(A)
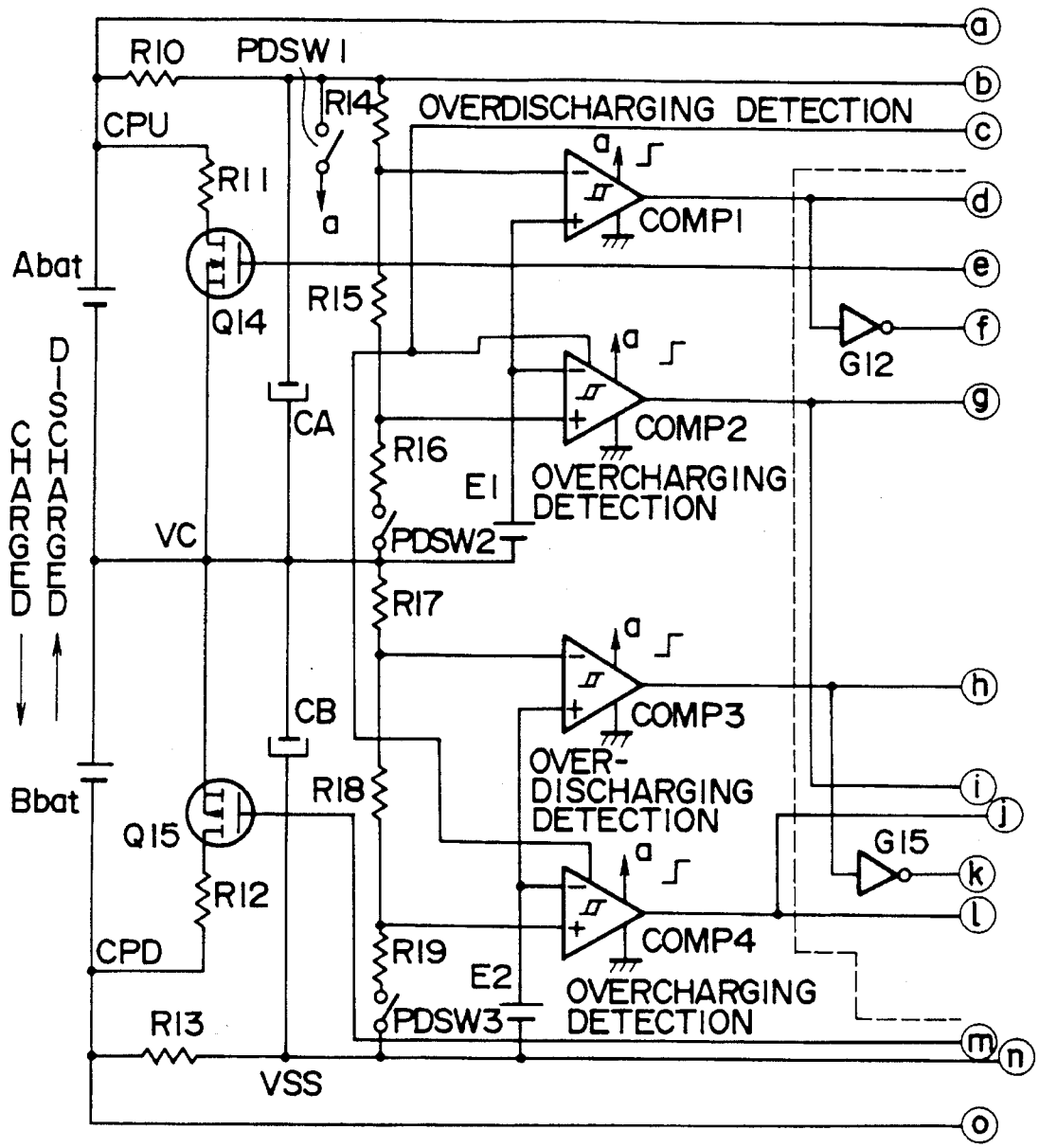
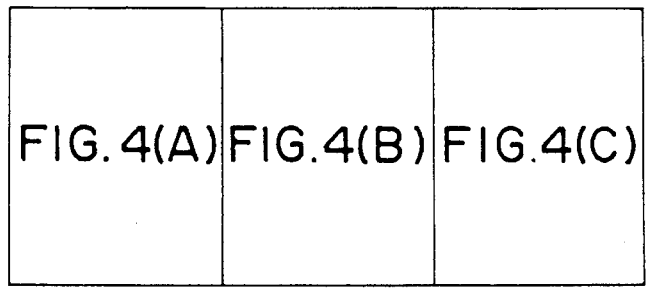
FIG. 4
| FIG. 4(A) | FIG. 4(B) | FIG. 4(C) |

SW1~SW2 : POWER-DOWN SW
D1, D2 : POWER MOS PARASITIC DIODE

BATTERY PROTECTION CIRCUIT

BACKGROUND OF THE INVENTION

1. Field of the Invention

The present invention relates to a battery protection circuit for preventing a secondary cell from being overcharged and overdischarged.

2. Description of the Related Art

Battery packs composed of a plurality of series-connected cells are protected from damage either by a battery charger which detects overcharging or overdischarging with respect to a total voltage across the series-connected cell, or by turning on and off a load connected to the battery pack.

Generally battery chargers or battery loads, rather than batteries themselves, have a battery protecting function. When abnormal overcharging is caused by a battery charger or an overcurrent flows through a battery load, a thermostat or the like in contact with the battery or battery pack detects the temperature and turns off the power supply to the charges or disconnects the load.

Another known battery protection circuit is disclosed in Japanese laid-open patent publication No. 04-75430 published Mar. 10, 1992 which was filed by Asahi Chemical Industry Co., Ltd.

According to the disclosed arrangement, a chargeable power supply device having a boost-chargeable secondary cell employs a device having a parasitic diode in the charging and discharging circuits to prevent overdischarging and overcharging.

More specifically, when the voltage across a cell drops below a certain voltage at the time it is discharged, a controller produces an output voltage to render a MOSFET non-conductive, thus cutting off the discharging circuit for the cell. When the voltage across the cell is restored by being charged through the parasitic diode of the MOSFET, the cell is charged in a normal mode with a low loss. Similarly, when the voltage across the cell rises above a certain voltage at the time it is charged, the controller produces an output voltage to render a MOSFET nonconductive, thus cutting off the charging circuit for the cell. When the voltage across the cell is restored by being discharged through the parasitic diode of the MOSFET, the cell is discharged in a normal mode with a low loss.

With the above process, however, if a battery is composed of a plurality of cells which have different characteristics, some of the cells tend to be overcharged or overdischarged. The above process cannot be used with respect to those cells which are damaged when overcharged and overdischarged.

There have also been proposed battery protection circuits as shown in prior inventions disclosed in Japanese patent application No. 3-213019 filed Jul. 31, 1991 and Japanese laid-open patent publication No. 5-49181 published Feb. 26, 1993, both filed by the same applicant as the present application. According to these prior inventions, while series-connected secondary cells are being repeatedly charged and discharged, even if the capacities of the cells are unequal due to the differences between the individual cells, the capacities of the cells can be brought back into equilibrium by a cell capacity balancing circuit in the charging and discharging circuit thereby preventing the cells from being overcharged and overdischarged.

The cell capacity balancing circuit is basically composed of a circuit arrangement for protecting the cells which comprises, for battery protection, a circuit for detecting overcharging, a circuit for detecting turning-off and overflowing of a charging current, a circuit for detecting overdischarging, and a circuit for detecting turning-off of a discharging current, hysteresis, and an overcurrent.

The battery protection circuits disclosed in the above prior publications and application are however disadvantageous in that even though overdischarging and overcharging of cells are detected, a current flows through the circuits after overdischarging is detected, and hence current consumption occurs at all times.

If a battery is composed of a plurality of cells and the cells have different characteristics, then only certain cells are liable to be overcharged or overdischarged. Such overcharging and overdischarging affect the performance of the cells.

OBJECTS AND SUMMARY OF THE INVENTION

It is therefore an object of the present invention to provide a battery protection circuit capable of minimizing a current flowing through the load circuit and also circuits which detect overcharging and overdischarging of a battery, after overcharging is detected, thereby suppressing discharging as much as possible to protect the battery.

Another object of the present invention is to greatly reduce a current consumed in a battery protection circuit upon overdischarging to extend a period of time in which the remaining capacity of a battery can maintain a load thereby suppressing an overdischarged condition of the battery to prevent battery performance from being degraded.

Still another object of the present invention is to allow a battery protection circuit to be automatically restored to a normal condition from a power-down mode.

Yet another object of the present invention is to prevent series-connected secondary cells from being degraded in performance to extend the service life of the battery.

Yet still another object of the present invention is to minimize mutual action of secondary cells to minimize the performance degradation of each secondary cell.

A further object of the present invention is to allow a battery to be used continuously while avoiding operation errors which would otherwise be caused by external fluctuations or disturbances such as load fluctuations or short circuits.

A still further object of the present invention is to balance secondary cells upon overcharging and overdischarging for a longer service life of the cells.

A yet further object of the present invention is to separate charging and discharging terminals from each other to prevent faults upon charging and discharging.

A yet still further object of the present invention is to prevent overcharging and overdischarging detection from being subject to errors.

Another object of the present invention is to allow secondary cells to be quickly charged even when they start to be charged from an overdischarged condition.

Still another object of the present invention is to keep all series-connected secondary cells of a battery matched to each other.

Yet another object of the present invention is to delay the detection of a voltage drop across a battery when an instantaneous large current flows, thus reliably preventing a battery protection circuit from operating in error.

Yet still another object of the present invention is to bring an overcharged cell and an overdischarged cell quickly into balance with each other.

According to the present invention, there is provided a battery protection circuit comprising a secondary cell, condition detecting means for detecting a voltage across the secondary cell and comparing the detected voltage with a reference voltage to detect an overdischarged condition or an overcharged condition of the secondary cell, first switch means for cutting off a discharging current, second switch means for cutting off a charging current, control means for controlling the first and second switch means based on a detected condition detected by the condition detecting means, third switch means for cutting off electric power supplied to the condition detecting means, and power-down mode means for rendering the third switch means nonconductive when the overdischarged condition is detected by the condition detecting means.

The battery protection circuit further comprises power-down mode canceling means for restoring the third switch means from a nonconductive condition to a conductive condition when the secondary cell starts being charged again from the overdischarged condition. A plurality of secondary cells are connected in series with each other, and the power-down mode means comprises means for rendering the third switch means nonconductive when the overdischarged condition of one or all of the secondary cells is detected by the condition detecting means. The battery protection circuit further comprises power-down mode inhibiting means for holding the third switch means conductive if either one of the secondary cells is in the overcharged condition as detected by the condition detecting means.

The battery protection circuit further comprises voltage drop preventing means for holding the third switch means conductive detected in the event an instantaneous large current flows through the secondary cell or cells. The battery protection circuit further comprises means for restoring the capacity balance of the secondary cells if the secondary cells are out of capacity balance.

According to the present invention, there is also provided a battery protection circuit comprising a secondary cell, condition detecting means for detecting a voltage across the secondary cell and comparing the detected voltage with a reference voltage to detect an overdischarged condition or an overcharged condition of the secondary cell, first switch means for cutting off a discharging current, second switch means for cutting off a charging current, control means for controlling the first and second switch means based on a detected condition detected by the condition detecting means, power-down switch means for cutting off electric power supplied to the condition detecting means, power-down mode means for rendering the power-down switch means nonconductive when the overdischarged condition is detected by the condition detecting means, and power-down mode canceling means for restoring the power-down switch means from a nonconductive condition to a conductive condition when the secondary cell starts being charged again from the overdischarged condition, the power-down mode canceling means comprising means for restoring the power-down switch means to the conductive condition after the voltage across the secondary cell exceeds a predetermined voltage.

A plurality of secondary cells are connected in series with each other, and the power-down mode means comprises means for rendering the power-down means nonconductive when the overdischarged condition of one or all of the secondary cells is detected by the condition detecting means. The control means comprises means for holding the power-down switch means conductive for a first interval of time if an instantaneous large current flows through the secondary cells for a second interval of time which is shorter than the first interval of time. The battery protection circuit further comprises power-down mode inhibiting means for holding the third switch means conductive if any of the secondary cells is in the overcharged condition as detected by the condition detecting means.

The battery protection circuit further comprises forced charging means for forcibly rendering the secondary cell or cells chargeable if the power-down switch means is nonconductive and the voltage across the secondary cell or cells is substantially 0 V. The battery protection circuit further comprises charging and discharging terminals which are connected to the secondary cell or cells and which are separate from each other.

When a secondary cell is overdischarged, the battery protection circuit enters a power-down mode to greatly reduce a current consumed by the circuit. The battery protection circuit can automatically recovered from the power-down mode. In the case where a plurality of cells are connected in series with each other, the power-down mode is initiated by detecting overdischarging of one or all of the secondary cells, allowing the cells to be balanced upon overcharging or overdischarging and to be charged from 0 V in the power-down mode.

The voltages across the cells of a battery pack are monitored to detect overcharging or overdischarging for turning on and off switches on the battery pack to, a load, and to a battery charger. Consequently, any effect of charger or load faults can be minimized. Depending on the condition of overcharging or overdischarging, the cells of the battery pack can be balanced with each other. In the power-down mode, circuits used to detect voltages and effect control are de-energized to reduce current consumption in an overdischarged region. Those circuits can be recovered from the power-down mode simply by a charging operation.

The above and other objects, features, and advantages of the present invention will become apparent from the following description when taken in conjunction with the accompanying drawings which illustrate preferred embodiments of the present invention by way of example.

DETAILED DESCRIPTION OF THE PREFERRED EMBODIMENTS

Figure 1:
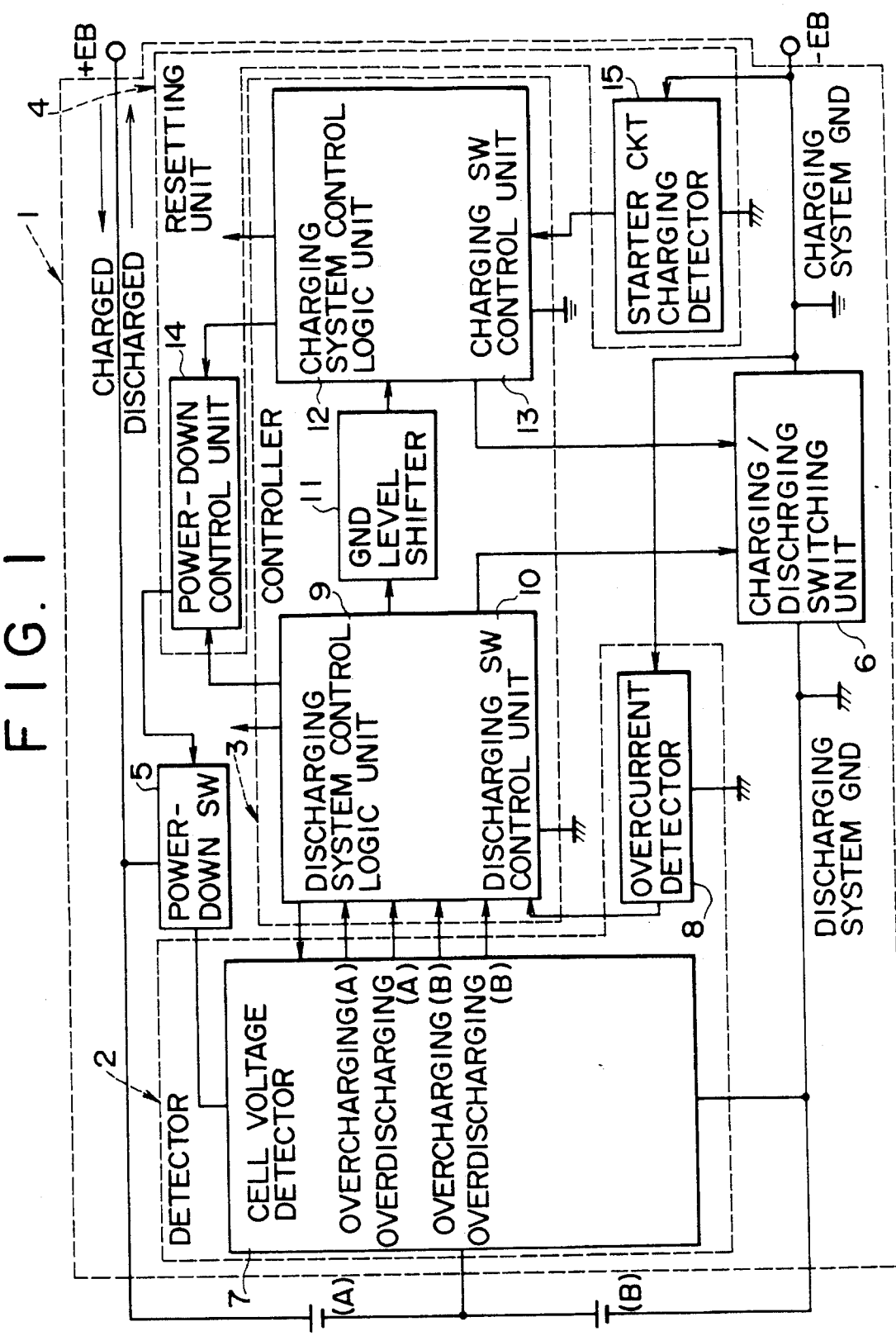
FIG. 1 is a block diagram of a battery protection circuit according to the present invention.

FIG. 1 shows in block form a battery protection circuit according to the present invention. As shown in FIG. 1, the battery protection circuit, generally designated by the reference numeral 1, comprises a detector 2, a controller 3, a resetting unit 4, a power-down switch 5, and a charging/discharging switch 6, which charging and discharging of a plurality of cells Abat, Bbat as a battery.

The detector 2 comprises a cell voltage detector 7 and an overcurrent detector 8. The cell voltage detector 7 serves to detect an overcharged condition (A, B) and an overdischarged condition (A, B) based on the voltages across the cells Abat, Bbat. The overcurrent detector 8 serves to detect an overcurrent.

The controller 3 comprises a discharging system control logic unit 9 a discharging switch control unit 10, a ground level shifter 11, a charging system control logic unit 12 and a charging switch control unit 13.

The discharging system control logic unit 9 and the discharging switch control unit are supplied with signals indicative of overcharged and overdischarged conditions of the cells Abat, Bbat which are detected by the cell voltage detector 7, and a signal indicative of an overcurrent which is detected by the overcurrent detector 8. The controller 3 applies an overflow current signal to the cell voltage detector 7, a charging switch signal to the charging/discharging switch 6, and a power-down signal to the resetting unit 4.

The discharging system control logic unit 9 and the discharging switch control unit 10 supply a ground signal through the ground level shifter 11 to the charging system control logic unit 12 and the charging switch control unit 13.

The discharging system control logic unit 9 and the discharging switch control unit 10 have a discharging switch. The charging system control logic unit 12 and the charging switch control unit 13 have a charging switch. These discharging and charging switches having different ground potentials. The ground level shifter 11 serves to set the ground potentials of the discharging and charging switches to a constant reference potential.

The charging system control logic unit 12 and the charging switch control unit 13 control the charging/discharging switch 6 and outputs a power-down canceling signal to the resetting unit 4 based on the cell condition and the charging detection from the charging detector 15. The power-down canceling signal is outputted when the cell voltage becomes equal to or higher than a predetermined voltage.

The resetting unit 4 is composed of a power-down control unit 14 and a starter charging detector 15. The power-down control unit 14 sends a power-down signal from the discharging system control logic unit 9 and the charging system control logic unit 12 to the power-down switch 5. The starter charging detector 15 starts to charge the cells Abat, Bbat manually or automatically.

The power-down switch 5 sends a power-down signal from the power-down control unit 14 to the detector 2 and the controller 3, turning off the power supply thereby to enter a power-down mode.

The charging/discharging switch 6 serves to control charging and discharging of the cells Abat, Bbat under the control of the discharging switch control unit 10 and the charging switch control unit 13.

Operation of the battery protection circuit 1 when the cells Abat, Bbat are charged and discharged will generally be described below with reference to FIG. 1.

(A) When the cells Abat, Bbat are discharged:

The cell voltage detector 7 monitors a discharged condition of the cells Abat, Bbat of the battery. When either the cell Abat or the cell Bbat is overdischarged, the cell voltage detector 7 applies an overdischarging signal (A) or an overdischarging signal (B) to the discharging system control logic unit 9. The discharging system control logic unit 9 then controls the discharging switch control unit 10 to turn off the discharging switch of the charging/discharging switch 6.

When the discharging switch of the charging/discharging switch 6 is turned off, cells other than the overdischarged cell are overflow-discharged. If both of the cells Abat, Bbat are overdischarged, then the battery protection circuit 1 enters the power-down mode.

The battery protection circuit 1 may enter the power-down mode when either one of the cells Abat, Bbat is overdischarged. Therefore, in the case where the battery is composed of the cells Abat, Bbat, the battery protection circuit 1 enters the power-down mode whenever either the battery Abat or the battery Bbat is overdischarged.

If the overcurrent detector 8 detects a certain excessive current that flows for a predetermined period of time when the cells Abat, Bbat are discharged, the discharging switch control unit 10 turns off the discharging switch of the charging/discharging switch 6. If an instantaneous large overcurrent ceases to flow within the predetermined period of time, then the discharging switch is not turned off, and even if a cell is overdischarged by such a large current, the battery protection circuit 1 does not enter the power-down mode provided such overdischarging is eliminated within the predetermined period of time.

(B) When the cells Abat, Bbat are charged:

If the cell voltage detector 7 detects an overcharged condition of the cell Abat or Bbat of the battery, the cell voltage detector 7 applies an overcharging (A) signal or an overcharging signal (B) to the charging system control logic unit 12. The charging system control logic unit 12 then turns off the charging switch of the charging/discharging switch 6. The overcharged cell is discharged by an overflow circuit.

To charge the cells from the power-down mode, they are forcibly charged under the control of the charging switch control unit 13 based on a charging-detected signal from the starter charging detector 15, and the battery protection circuit 1 is forcibly released from the power-down mode. When a total cell voltage rises up to a predetermined voltage as detected by the cell voltage detector 7, the discharging control logic unit 9 delivers a power-down canceling signal to the power-down control unit 14, causing the battery protection circuit 1 to leave the power-down mode.

Thus, the cell leaves the overdischarged condition, and enters a normally charged condition. Even if one of the cells Abat, Bbat is overdischarged, no power-down mode is initiated but priority is given to an overcharged condition provided the other cell is overcharged.

Figure 2:
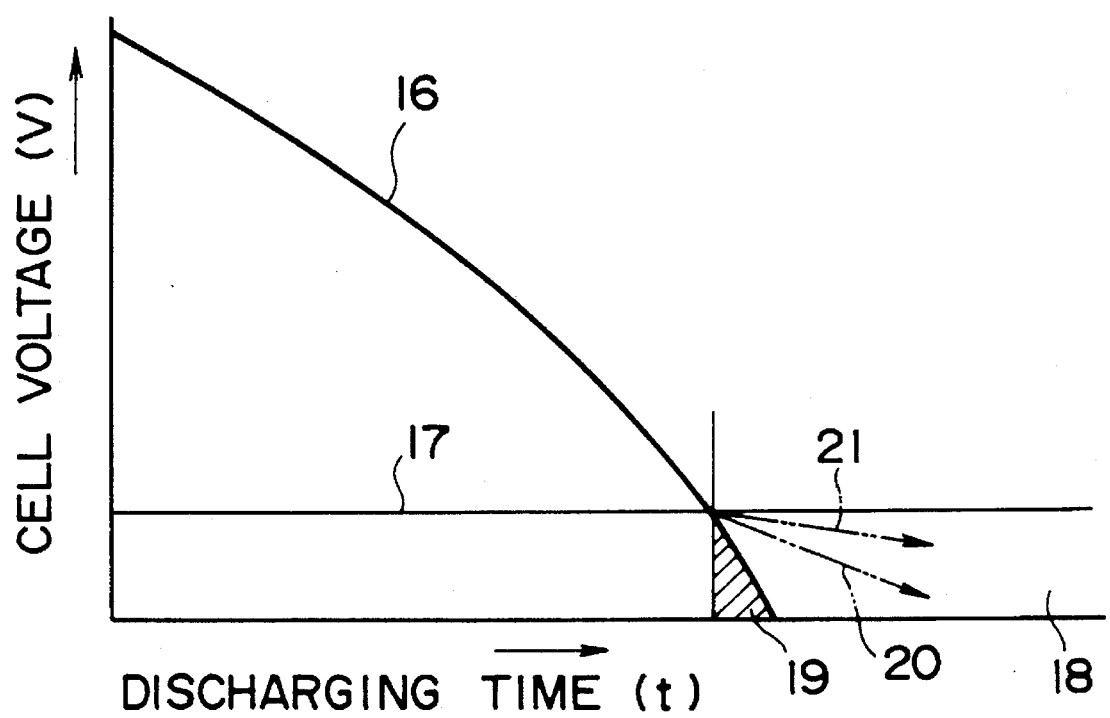
FIG. 2 is a graph showing battery discharging characteristics of the battery protection circuit shown in FIG. 1.

(C) Power-down mode:

Discharging characteristics of the battery composed of the cells Abat, Bbat and the power-down mode will be described below. As shown in FIG. 2, when the battery is discharged, the cell voltage continuously drops with time along a discharging curve 16, and an overdischarged condition is reached when the cell voltage falls below a predetermined overdischarged voltage 17.

When the overdischarged condition is detected by the detector 2 shown in FIG. 1, the discharging switch of the charging/discharging switch 6 is turned off, and the battery is no longer discharged with respect to a load connected thereto. The voltage across the battery is held in an overdischarged region 18, and a remaining capacity 19 can be calculated in advance.

Even when the battery is no longer discharged with respect to the load, a slight current subsequently flows into the battery protection circuit 1 shown in FIG. 1. Since the battery continues to be discharged, the remaining capacity 19 has a discharging curve in the direction indicated by the arrow 20 in FIG. 2.

The power-down mode is introduced in view of the above discharging characteristics. In the power-down mode, circuits other than minimum circuits required in the battery protection circuit in the overdischarged condition are supplied with no current.

The power-down mode allows the remaining capacity 19 to have a discharging curve in the direction indicated by the arrow 21 in FIG. 2. Therefore, the period of time in which the voltage is maintained by the remaining capacity 19 when the battery is overdischarged in the power-down mode is increased from the corresponding period of time if no power-down mode is provided. For example, if it is assumed that the remaining capacity in the overdischarged condition is 30 mAh, the current consumed by the circuit in order to operate in the overdischarged region 18 is 20 μA, and the current consumed by the circuit in order to operate in the overdischarged region 18 in the power-down mode is 1 μA, then it is possible to greatly improve the time for the cell voltage to reach 0 V from the overdischarged region 18 as shown in Table 1 below.

TABLE 1

|  | During operation | Power-down mode |
| --- | --- | --- |
| Consumed current | 20 μA | 1 μA |
| Remaining battery life | About 1,500 hours About 2 months | About 30,000 hours About 3.5 years |

As can be understood from the above Table 1, the time for the cell voltage to be reduced to 0 V is largely extended from 1,500 hours to 30,000 hours. Since the consumed current is actually reduced when the cell voltage is lowered, however, the cell voltage can be maintained for a longer period of time, resulting in the prevention of a battery performance degradation which would otherwise be caused when the battery is overdischarged.

Figure 3B:
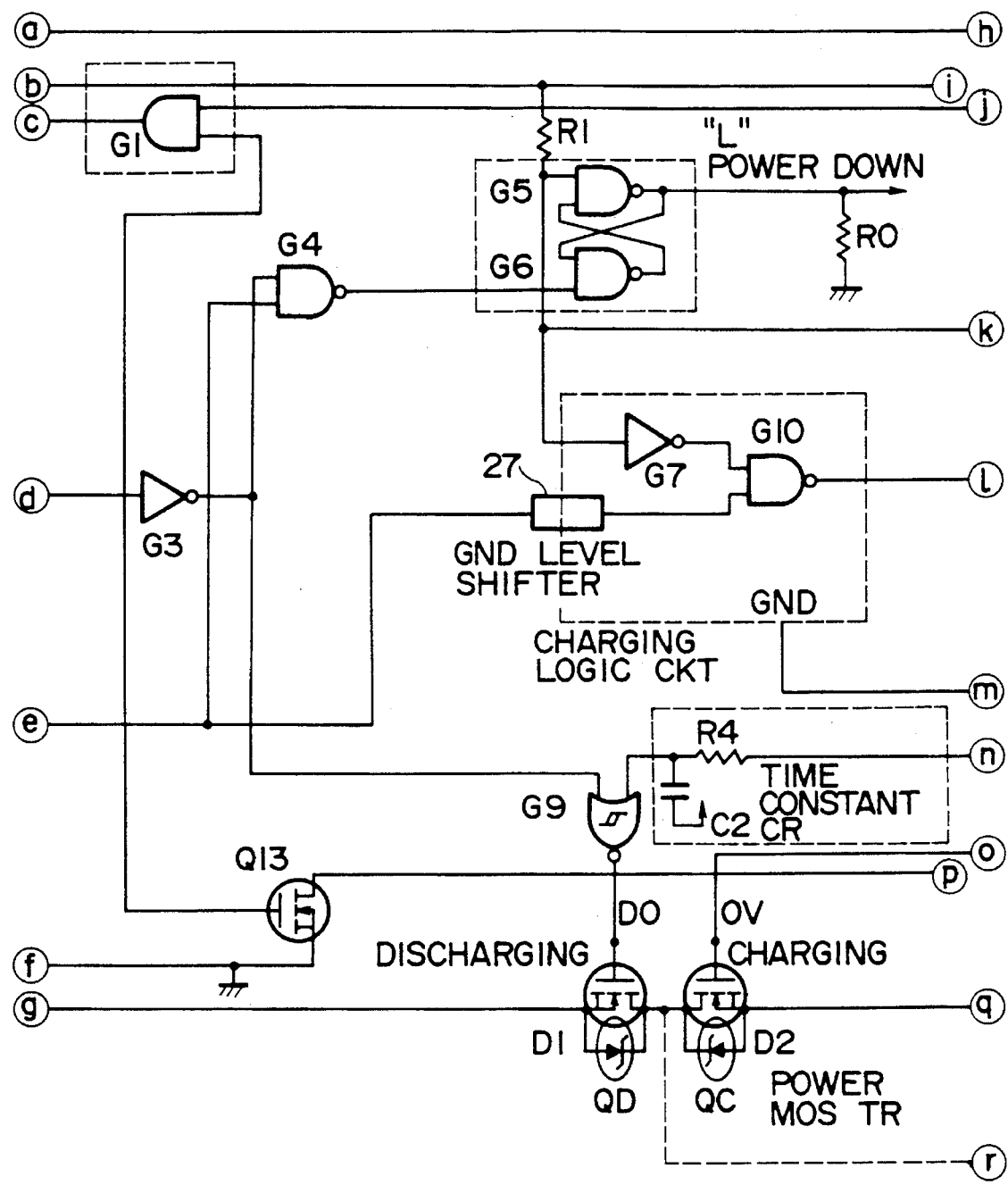
FIG. 3 is a detailed circuit diagram of a battery protection circuit according to a first embodiment of the present invention.
Figure 3C:
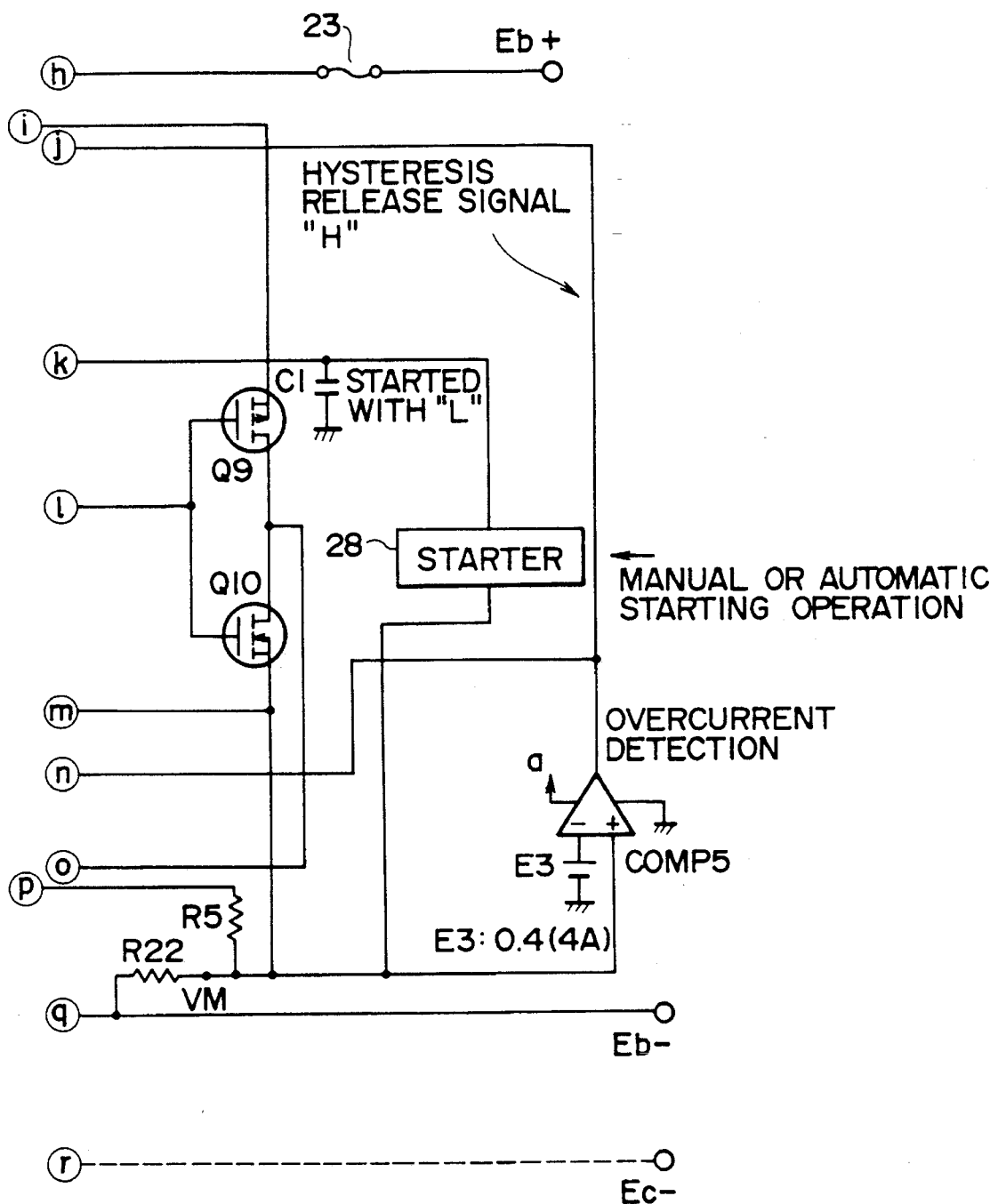

(1) 1st embodiment:

<1> Circuit arrangement of the 1st embodiment:

The circuit arrangement of a battery protection circuit according to a first embodiment of the present invention will be described below with reference to FIG. 3. As shown in FIG. 3, the battery protection circuit mainly comprises five comparators, a plurality of switching elements, and a plurality of gates, which are connected as follows:

A battery combined with the battery protection circuit is composed of a cell Abat and a cell Bbat that are connected in series with each other. A positive connection terminal Eb+ which is connected to the positive terminal of a charger or a load is connected to the positive terminal of the cell Abat through a fuse 23, and the negative terminal of the cell Abat is connected to the positive terminal of the cell Bbat.

The negative terminal of the cell Bbat is connected to a negative connection terminal Eb− connected to the negative terminal of the charger or the load through a discharging power N-channel MOS (NMOS) transistor QD and a charging power NMOS transistor QC.

The positive connection terminal Eb+ is also connected through a protective resistor R10 to a terminal VDD of the battery protection circuit. The positive connection terminal Eb+ is also connected to a terminal CPU that is connected through a resistor R11 to the drain terminal of an NMOS transistor Q14.

The junction between the negative terminal of the cell Abat and the positive terminal of the cell Bbat is connected to a terminal VC. The negative terminal of the cell Bbat is connected to a terminal CPD that is connected through a resistor R12 to the drain terminal of a P-channel MOS (PMOS) transistor Q15 and also through a resistor R13 to a terminal VSS.

A smoothing capacitor CA is connected to the terminals VDD, VC, and a smoothing capacitor CB is connected to the terminals VC, VSS.

The power NMOS transistor QD is a transistor having source, gate, and drain terminals and a parasitic diode D1. The source terminal is connected to the negative terminal of the cell Bbat. The gate terminal is connected to a terminal D0, and the drain terminal is connected to the drain terminal of the power NMOS transistor QC.

The power NMOS transistor QC is a transistor having source, gate, and drain terminals and a parasitic diode D2. The source terminal is connected to the negative terminal Eb−. The gate terminal is connected to a terminal OV, and the drain terminal is Connected to the drain terminal of the power NMOS transistor QD. The negative terminal Eb− is coupled through a protective resistor R22 to a terminal VM. A terminal Ec− for distinguishing charging and discharging circuits from each other may be connected to an intermediate junction between the drain terminal of the power NMOS transistor QD and the drain terminal of the power NMOS transistor QC.

A power-down switch PDSW1, which can be opened and closed by a power-down signal, has one terminal connected to the terminal VDD and the other terminal a connected to power supply input terminals of comparators COMP1, 2, 3, 4.

A power-down switch PDSW2, which can be opened and closed by a power-down signal, has one terminal connected to the terminal VC and the other terminal connected to a terminal of a resistor R16.

A power-down switch PDSW3, which can be opened and closed by a power-down signal, has one terminal connected to the terminal VSS and the other terminal connected to a terminal of a resistor R19.

The comparator COMP1 has two input terminals and one output terminal. An inverting input terminal (hereinafter referred to as a "negative input terminal") of the comparator COMP1 is connected to the junction between a terminal of a resistor R14 and a terminal of a resistor R15. A noninverting input terminal (hereinafter referred to as a "positive input terminal") of the comparator COMP1 is connected to a positive terminal of a source of a reference voltage E1 (+1.5 V). The output terminal of the comparator COMP1 is connected to an input terminal of a NOR gate G2. The other terminal of the resistor R14 is connected to the terminal VDD, and the other terminal of the resistor R15 is connected to the junction between the other terminal of the resistor R16 and a positive input terminal of the comparator COMP2. The negative terminal of the source of a reference voltage E1 is connected to the terminal VCC.

The comparator COMP2 has two input terminals and one output terminal. A negative input terminal of the comparator COMP2 is connected to the positive terminal of the source of the reference voltage E1, and a positive input terminal of the comparator COMP2 is connected to the junction between the resistors R15, R16. The output terminal of the comparator COMP2 is connected to an input terminal of a NOR gate G8 and the gate terminal of the NMOS transistor Q14. The comparator COMP2 has a hysteresis switch input terminal connected to the output terminal of an AND gate G1.

The comparator COMP3 has two input terminals and one output terminal. A negative input terminal of the comparator COMP3 is connected to the junction between a terminal of a resistor R17 and a terminal of a resistor R18. A positive input terminal of the comparator COMP3 is connected to a positive terminal of a source of a reference voltage E2 (+1.5 V). The output terminal of the comparator COMP3 is connected to the other input terminal of the NOR gate G2. The other terminal of the resistor R17 is connected to the terminal VC, and the other terminal of the resistor R18 is connected to the other terminal of the resistor R19 and a positive input terminal of the comparator COMP4.

The comparator COMP4 has two input terminals and one output terminal. A negative input terminal of the comparator COMP4 is connected to the positive terminal of the source of the reference voltage E2. A positive input terminal of the comparator COMP4 is connected to the junction between the resistors R18, R19. The output terminal of the comparator COMP4 is connected to the other input terminal of the NOR gate G8 and the gate terminal of NMOS transistor Q15. The comparator COMP4 has a hysteresis switch input terminal connected to the output terminal of the AND gate G1.

The comparator COMP5 has two input terminals and one output terminal. A negative input terminal of the comparator COMP5 is connected to a positive terminal of a source of a reference voltage E3 (+0.4 V). A positive input terminal of the comparator COMP5 is connected to the terminal VM. The output terminal of the comparator COMP5 is connected to a terminal of a resistor R4 which provides a time constant CR and an input terminal of the AND gate G1. The other terminal of the resistor R4 is connected to an input terminal of a NOR gate G9 and a terminal of a capacitor C2 whose other terminal is connected to the terminal VDD.

The AND gate G1 has two input terminals and one output terminal. One input terminal of the AND gate G1 is connected to the output terminal of the comparator COMP5, and the other input terminal of the AND gate G1 is connected to the output terminal of the NOR gate G2. The output terminal of the AND gate G1 is coupled to the hysteresis switch input terminals of the comparators COMP2, 4.

The NOR gate G2 has two input terminals and one output terminal. One input terminal of the NOR gate G2 is connected to the output terminal of the comparator COMP1, and the other input terminal of the NOR gate G2 is connected to the output terminal of the comparator COMP3. The output terminal of the NOR gate G2 is connected to the other input terminal of the AND gate G1, the input terminal of an inverter G3, and the gate terminal of an NMOS transistor Q13.

The inverter G3 has its input terminal connected to the output terminal of the NOR gate G2, and its output terminal connected to an input terminal of a NAND gate G4 and an input terminal of a NOR gate G9.

The NAND gate G4 has two input terminals and one output terminal. One input terminal of the NAND gate G4 is connected to the output terminal of the inverter G3, and the other input terminal of the NAND gate G4 is connected to the output terminal of the NOR gate G8. The output terminal of the NAND gate G4 is connected to an input terminal of a NAND gate G6 of a power-down latch circuit.

The power-down latch circuit also has a NAND gate G5 which has two input terminals and one output terminal. The NAND gates G5, G6 jointly make up the power-down latch circuit. One input terminal of the NAND gate G5 is connected to a terminal of a resistor R1, and the other input terminal of the NAND gate G5 is connected to the output terminal of the NAND gate G6. The output terminal of the NAND gate G5 is connected to a terminal of a resistor R0, and generates a power-down signal. The other terminal of the resistor R0 is grounded, and the other terminal of the resistor R1 is connected to the terminal VDD.

The NAND gate G6 has two input terminals and one input terminal. One input terminal of the NAND gate G6 is connected to the output terminal of the NAND gate G5, and the other input terminal of the NAND gate G6 is connected to the output terminal of the NAND gate G4. The output terminal of the NAND gate G6 is connected to one of the input terminals of the NAND gate GS.

An inverter G7, which is an element of a charging logic circuit, has an input terminal connected through the resistor R1 to the terminal VDD and an output terminal connected to an input terminal of a NAND gate G10.

The NOR gate G8 has two output terminals and one input terminal. One input terminal of the NOR gate G8 is connected to the output terminal of the comparator COMP2, and the other input terminal of the NOR gate G8 is connected to the output terminal of the comparator COMP4. The output terminal of the NOR gate G8 is connected to one of the input terminals of the NAND gate G4 and an input terminal of a ground level shifter 27 of the charging logic circuit.

The NOR gate G9 has two input terminals and one input terminal. One input terminal of the NOR gate G9 is connected to the output terminal of the inverter G3, and the other input terminal of the NOR gate G9 is connected to the joined ends of the resistor R4 and the capacitor C2. The output terminal of the NOR gate G9 is connected through the terminal D0 to the gate terminal of the power NMOS transistor QD.

The NAND gate G10 has two input terminals and one input terminal. One output terminal of the NAND gate G10 is connected to the output terminal of the inverter G7, and the other input terminal of the NAND gate G10 is connected to the output terminal of the ground level shifter 27. The output terminal of the NAND gate G10 is connected to the gate terminal of a PMOS transistor Q9 and the gate terminal of an NMOS transistor Q10.

The PMOS transistor Q9 is a transistor having source, gate, and drain terminals. The source terminal is connected to the terminal VDD. The gate terminal is connected to the output terminal of the NAND gate G10, and the drain terminal is connected to the drain terminal of the NMOS transistor Q10 and also to the gate terminal of the power NMOS transistor QC through the terminal OV.

The NMOS transistor Q10 is a transistor having source, gate, and drain terminals. The source terminal is connected to the terminal VM and the ground level of the charging logic circuit. The gate terminal is connected to the output terminal of the NAND gate G10, and the drain terminal is connected to the drain terminal of the power PMOS transistor Q9 and also to the gate terminal of the power NMOS transistor QC through the terminal OV.

The NMOS transistor Q13 is a transistor having source, gate, and drain terminals. The source terminal is connected to the terminal VSS, and the gate terminal is connected to the output terminal of the NOR gate G2. The drain terminal is connected to one terminal of a resistor R5. The other terminal of the resistor R5 is coupled to the terminal VM.

The NMOS transistor Q14 is a transistor having source, gate, and drain terminals. The source terminal is connected to the terminal VC, and the gate terminal is connected to the output terminal of the comparator COMP2. The drain terminal is connected through the resistor R11 to the terminal CPU.

The PMOS transistor Q15 is a transistor having source, gate, and drain terminals. The source terminal is connected to the terminal VC, and the gate terminal is connected to the output terminal of the comparator COMP4. The drain terminal is connected through the resistor R12 to the terminal CPD.

The ground level shifter 27 has its input terminal connected to the output terminal of the NOR gate G8, and its output terminal connected to one of the input terminals of the NAND gate G10.

A starter 28 has an input terminal connected to the terminal VM and an output terminal connected to the terminal VDD through one terminal of a capacitor C1 and the resistor R1. The other terminal of the capacitor C1 is connected to ground.

The voltages across the cells Abat, Bbat combined with the battery protection circuit, as detected through the ladder resistors R14, R15, R11, R17, R18, R19, are compared with the reference voltages E1, E2 (+1.5 V) by the comparators COMP1–4 for detecting overcharging and overdischarging. Specifically, the comparators COMP1, COMP3 are supplied with the positive reference voltages E1, E2 (+1.5 V) at their positive input terminals, and the comparators COMP2, COMP4 are supplied with the positive reference voltages E1, E2 (+1.5 V) at their negative input terminals, for comparison with detected voltages which are produced by dividing the voltages across the cells Abat, Bbat over the ladder resistors.

The ladder resistors R14, R15, R11, R17, R18, R19 which are series-connected serve to divide the voltages across the cells Abat, Bbat so that they can be compared with the reference voltages E1, E2 (+1.5 V) when the cells are overcharged or overdischarged. The comparator COMP5 is used to compare the reference voltage E3 (+0.4 V) with the voltage at the negative terminal Eb– for the detection of an overcurrent.

<2> Operation of the 1st embodiment:

Operation of the battery protection circuit using the above reference voltages will be described below.

(a) Charging and overcharging:

When the secondary cells Abat, Bbat are charged, a charging current flows from the positive terminal Eb+, which is connected to an external charger or a load with respect to which the cells are discharged, through the secondary cells Abat, Bbat and the power NMOS transistors QD, QC to the negative terminal Eb–.

For the cell Abat, the charging current is checked by monitoring an overcharging voltage relative to 4.4 V with an overcharging detecting circuit composed mainly of the comparator COMP2. When an overcharged condition is detected, the comparator COMP2 outputs a high-level (H-level) signal from its output terminal.

The H-level signal from the comparator COMP2 is converted to a low-level (L-level) signal by the NOR gate G8. The L-level signal is applied to the input terminal of the ground level shifter 27, and shifted to a ground level. The NAND gate G10, i.e., the output section of the charging logic circuit, outputs an H-level signal.

Figure 5:
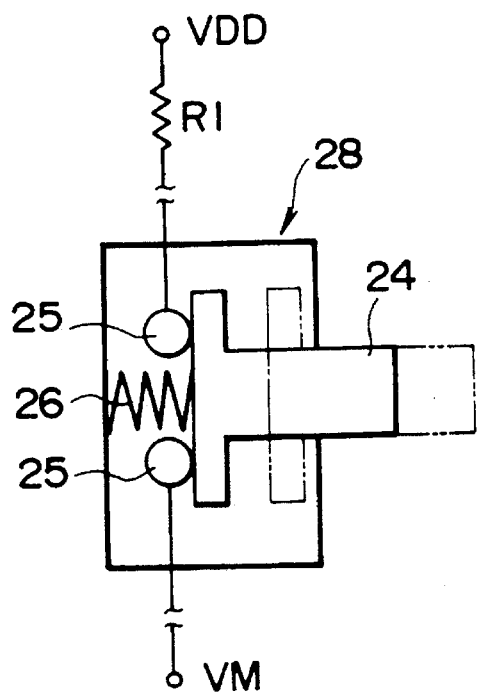
FIG. 5 is a schematic view of a starter of each of the battery protection circuits shown in FIGS. 3 and 4.

As shown in FIG. 5, the starter 28 has a button 24 that is normally biased away from contacts 25 by a spring 26. When a battery charger connected to the battery protection circuit is set, the button 24 is pushed into contact with the contacts 25 against the bias of the spring 26, thereby connecting the contacts 25 to each other.

Since the contacts 25 are connected to each other during charging, an L-level signal from the terminal VM is applied to the input terminal of the inverter G7, which outputs an H-level signal. Therefore, the output terminal of the NAND gate G10 produces an L-level signal, turning on the PMOS transistor Q9 and turning off the NMOS transistor Q10. The power NMOS transistor QC is turned off, cutting off the charging current.

At this time, if no overcurrent is detected, then the signal from the output terminal of the comparator COMP5 is an L-level signal, and therefore the signal applied from the output terminal of the AND gate G1 to the hysteresis input terminal of the comparator COMP2 is an L-level signal. Consequently, the battery protection circuit can be prevented from immediately operating to start charging the cells again by giving a hysteresis interval voltage margin as of 0.2 V to the comparators COMP2, 4.

Simultaneously, the H-level signal from the output terminal of the comparator COMP2 turns on the NMOS transistor Q14 to discharge an overcharging overflow current for thereby protecting the cell Abat. Specifically, when the NMOS transistor Q14 is turned on, a current flows to the resistor R11 through the terminal CPU that is connected to the positive terminal of the cell Abat, discharging the cell Abat to a voltage of 4.2 V, for example, which is lower by the hysteresis interval. The comparator COMP4 and the PMOS transistor Q15 which are associated with the cell Bbat operate in the same manner as described above.

Accordingly, after the charging current is cut off, the circuit which gives hysteresis to avoid immediate recharging is operated to discharge an overcharging overflow current for thereby protecting the battery, i.e., the cells Abat, Bbat.

(b) Overdischarging:

The battery composed of the cells Abat, Bbat is discharged by connecting a load between the positive and negative terminals Eb+, Eb−. The discharged condition is monitored by an overdischarging detecting circuit composed mainly of the comparators COMP1, COMP3 at all times. The comparator COMP1 and its associated components for detecting an overcharged condition of the cell Abat will be described below. When a discharged condition continues and the voltage across the cell Abat reaches an overdischarged voltage of 2.4 V, for example, the voltage is compared with the reference voltage E1 (+1.5 V) by the comparator COMP1, which outputs an H-level signal from its output terminal.

The H-level signal from the output terminal of the comparator COMP1 is applied through the NOR gate G2 and the inverter G3 to the NOR gate G9, which produces an L-level output signal, turning off the power NMOS transistor QD to cut off the discharging current.

An L-level signal (power-down signal) from the NAND gate G4 is applied to the NAND gate G6 of the power-down latch circuit. The NAND gates G5, G6 latch the applied L-level signal, and hold the latched condition, whereupon the power-down signal is of an L level, causing the battery protection circuit to enter the power-down mode.

The L-level power-down signal turns off the sources of the reference voltages E1, E2, E3. At the same time, the L-level power-down signal opens the power-down switch PDSW1 connected to the terminal VDD, turning off the power supply connected to the comparators COMP1, COMP2, COMP3, COMP4, COMP5.

The battery protection circuit is switched such that signals from the output terminals of the comparators COMP2, 4, i.e., output signals from the overcharging detecting circuit, are of an L level, overdischarging output signals from the comparators COMP1, 3 are of an H level, and an overcurrent detecting signal from the comparator COMP5 is of an H level, turning off both the power NMOS transistors QD, QC.

The L-level power-down signal opens the power-down switch PDSW2 connected to the terminal VC and the power-down switch PDSW3 connected to the terminal VSS, cutting off the power supplied to the ladder resistors R14, R15, R11, R17, R18, R19.

(c) Overcurrent detection:

An overcurrent is detected by a circuit composed mainly of the comparator COMP5 which compares a voltage with the reference voltage E3 (+0.4 V). More specifically, when a potential difference produced by a voltage drop that is developed by the resistance (e.g., a total of 100 mΩ) of the power NMOS transistors QD, QC as they are turned on exceeds the reference voltage E3 (+0.4 V), the output terminal of the comparator COMP5 produces an H-level signal.

The H-level signal from the output terminal of the comparator COMP5 is applied through the NOR gate G9 to turn off the power NMOS transistor QD, cutting off the discharging current, after elapse of a time interval as of about 1.8 msec. determined by the time constant CR of the resistor R4 and the capacitor C2. When the power NMOS transistor QD is turned off, the voltage of the positive terminal Eb+ is applied to the terminal VM through the load connected between the positive and negative terminals Eb+, Eb−. The high voltage at the terminal VM is of a value close to the voltage at the terminal Eb+, making it possible to hold the overcurrent detecting signal from the output terminal of the comparator COMP5 at an H level.

When the load connected between the positive and negative terminals Eb+, Eb− is removed, the voltage at the terminal VM is drained to about 0 V through the NMOS transistor Q13 and the resistor R5. The overcurrent detecting signal from the output terminal of the comparator COMP5 can now be brought to an L level, resulting in a recovery from the overcurrent condition.

The time constant CR provided by the resistor R4 and the capacitor C2 is of a time period longer than a predetermined period of about 1.8 msec. for example. This time constant CR is employed so as not to turn off the power NMOS transistor QD when a large instantaneous current of up to about 100 A flows because of a capacitive load or the like.

If the cells Abat, Bbat are brought out of balance, i.e., if one of the cells is overcharged, e.g., overflow-discharged after being charged, then the battery protection circuit is prevented from entering the power-down mode by the NAND gate G4 even if the other cell is overdischarged. Therefore, upon overdischarging of both cells, the sources of the reference voltages E1, E2, E3 are turned off, preventing the battery from being left overdischarged.

(d) Hysteresis canceling signal (output signal from the AND gate G1):

When the battery is discharged under an overcharged condition, e.g., immediately after it is charged, since the power NMOS transistor QC is turned off, the discharging current flows through the parasitic diode D2, and the voltage at the terminal VM is increased by a voltage of about 0.7 V, for example, in the forward direction across the parasitic diode D2. Then, the overcurrent detecting circuit is switched into operation, preventing the battery from being discharged.

To avoid this, when the signal from the output terminal of the comparator COMP5 of the overcurrent detecting circuit is of an H level, an H-level signal is applied to the hysteresis input terminals of the comparators COMP2, COMP4, forcibly releasing the hysteresis. When the hysteresis is canceled, the overcharging detection is brought back to a normal condition, turning on the power NMOS transistor QD, making it possible to discharge the battery.

When either the cell Abat or the cell Bbat is overdischarged, the hysteresis is inhibited from being cancelled by the AND gate G1. In the overdischarged condition, no discharging current flows, and hence when the hysteresis is canceled, the battery protection circuit enters the power-down mode. At this time, an overflow current from the overcharged cell Abat or Bbat is turned off. The hysteresis is inhibited from being canceled in order to prevent the battery from being left overcharged, thus protecting the battery. It is very rare for one of the cells to be overcharged and for the other cell to be overdischarged.

(e) Charging from the power-down mode:

When the battery charger is connected between the positive and negative terminals Eb+, Eb−, a charging voltage is applied between these terminals. Since the charging voltage is higher than the battery voltage, i.e., the voltage between the cells Abat, Bbat, the voltage at the negative terminal Eb− becomes lower than the voltage (ground level) at the negative terminal of the battery Bbat. In the power-down mode, as described above, both the power NMOS transistors QD, QC are turned off.

In this condition, the switch of the starter 28 is turned on, applying an L-level signal to the input terminal of the inverter G7. At this time, the inverter G7 and the NAND gate G10 turn on the PMOS transistor Q9 and turn off the NMOS transistor Q10 (see FIG. 8). The potential at the terminal OV is applied through the terminal VDD to the positive terminal Eb+. The power NMOS transistor QC is turned on to start charging the battery with a charging-current.

When the power NMOS transistor QC is turned on, the voltage at the negative terminal Eb– is increased to a voltage slightly lower than the ground level. This voltage varies depending on the voltages across the cells Abat, Bbat. Specifically, when the voltages across the cells Abat, Bbat are 0 V, the voltage between the drain and source terminals of the power NMOS transistor QC does not drop below a cutoff voltage Vgsoff of 2 V, for example, between the gate and source terminals of the power NMOS transistor QC.

Therefore, the power NMOS transistor QC is turned on when the gate voltage is 0 V and the source voltage, i.e., the voltage at the terminal VM, is negative, allowing a charging current to flow. At this time, inasmuch as the power NMOS transistor QD is turned off, the charging current flows through the parasitic diode D1 of the power NMOS transistor QD. The ground level of the charging logic circuit is the same as the potential at the terminal VM, a voltage corresponding to a charging-induced voltage drop across the power NMOS transistors QD, QC serves as an operating voltage for the power NMOS transistors QD, QC.

As the charging progresses, the voltage across the battery rises, and the gate voltage of the power NMOS transistor QC also rises, reducing a reduction in the voltage at the terminal VM. As the charging progresses more and the battery protection circuit leaves the power-down mode, the power NMOS transistor QD is turned on, and the voltage at the terminal VM is reduced to approximately 0 V.

When the voltages across both the cells Abat, Bbat become higher than the overdischarging voltage, the output terminals of both the comparators COMP1, COMP2 produce L-level signals, the output terminal of the NOR gate G2 produces an H-level signal, and an H-level signal is applied to the input terminal of the NAND gate G6. Because the signal applied to the input terminal of the NAND gate G5 is an L-level signal, the output signal from the NAND gate G5 is an H-level signal. The two input signals applied to the NAND gate G6 are of an H level, whereupon the latched signal of the power-down circuit is reversed in level, causing the battery protection circuit to leave the power-down mode.

(f) Recovery from the power-down mode:

Recovery from the power-down mode is carried out when the power-down signal changes from an L level to an H level.

Figure 6:
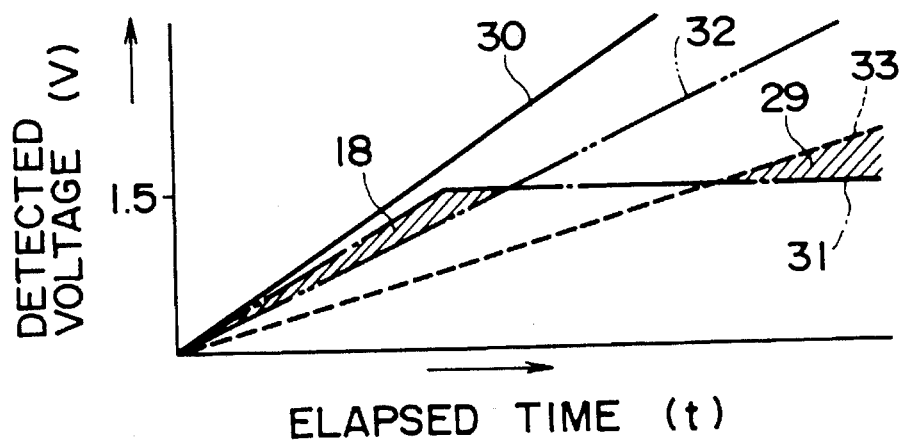
FIG. 6 is a graph of a reference voltage and detected overcharging and overdischarging regions, showing the manner in which the reference voltage rises with a battery voltage into a constant voltage.

As shown in FIG. 6, the reference voltages E1, E2, E3 can easily be obtained by having a reference voltage 31 rise with a cell voltage 30 up to a constant voltage.

If the reference voltages are 1.5 V, then the voltage which can maintain the reference voltages is required to be at least 3 V (the reference voltages E1+E2), and the range for detecting the voltage may be from 3 V (the reference voltages E1+E2) to 4 V (slightly lower than the overcharging voltage).

(g) Charging logic circuit:

When the charging process starts, an L-level signal is applied from the starter 28 to the inverter G7, which then outputs an H-level signal. The H-level signal is applied to one of the input terminals of the NAND gate G10, whose other input terminal is supplied with an H-level signal through the ground level shifter unless an overcharging condition exists. Therefore, the NAND gate G10 outputs an L-level signal.

The L-level signal from the NAND gate G10 turns off both the PMOS transistor Q9 and the NMOS transistor Q10. An H-level signal is applied to the terminal OV, turning on the power NMOS transistor QC to allow a charging current to flow.

The L-level signal supplied from the starter 28 is mechanically set as shown in FIG. 5. Therefore, the signal applied to the terminal OV is maintained at the H level, keeping the battery charged.

If the battery is overcharged, the overcharging detecting circuit applies an L-level signal through the ground level shifter to the NAND gate G10, which outputs an H-level signal. An L-level signal is then applied to the terminal OV, turning off the power NMOS transistor QC to cut off the charging current.

Figure 4B:
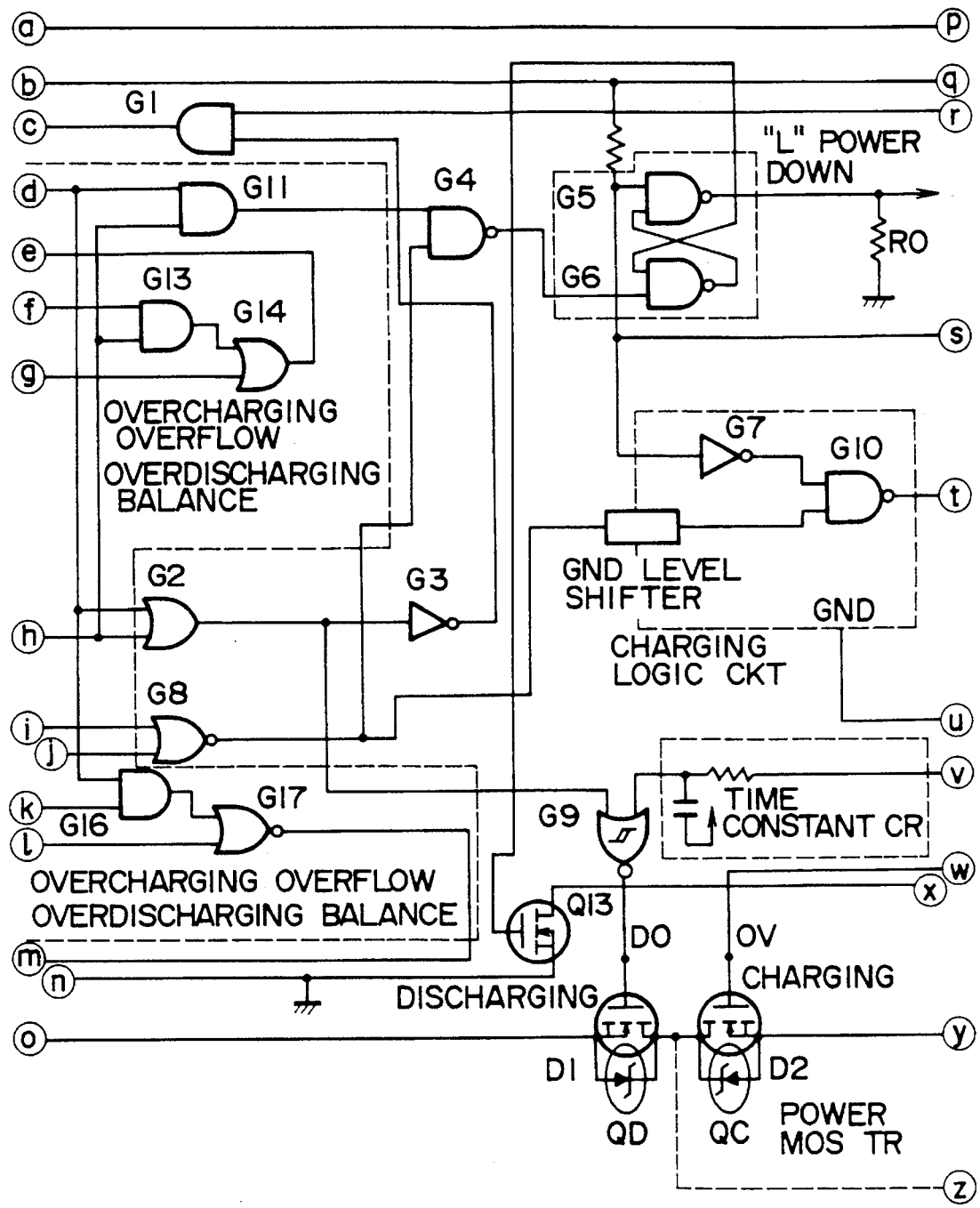
FIG. 4 is a detailed circuit diagram of a battery protection circuit according to a second embodiment of the present invention.
Figure 4C:
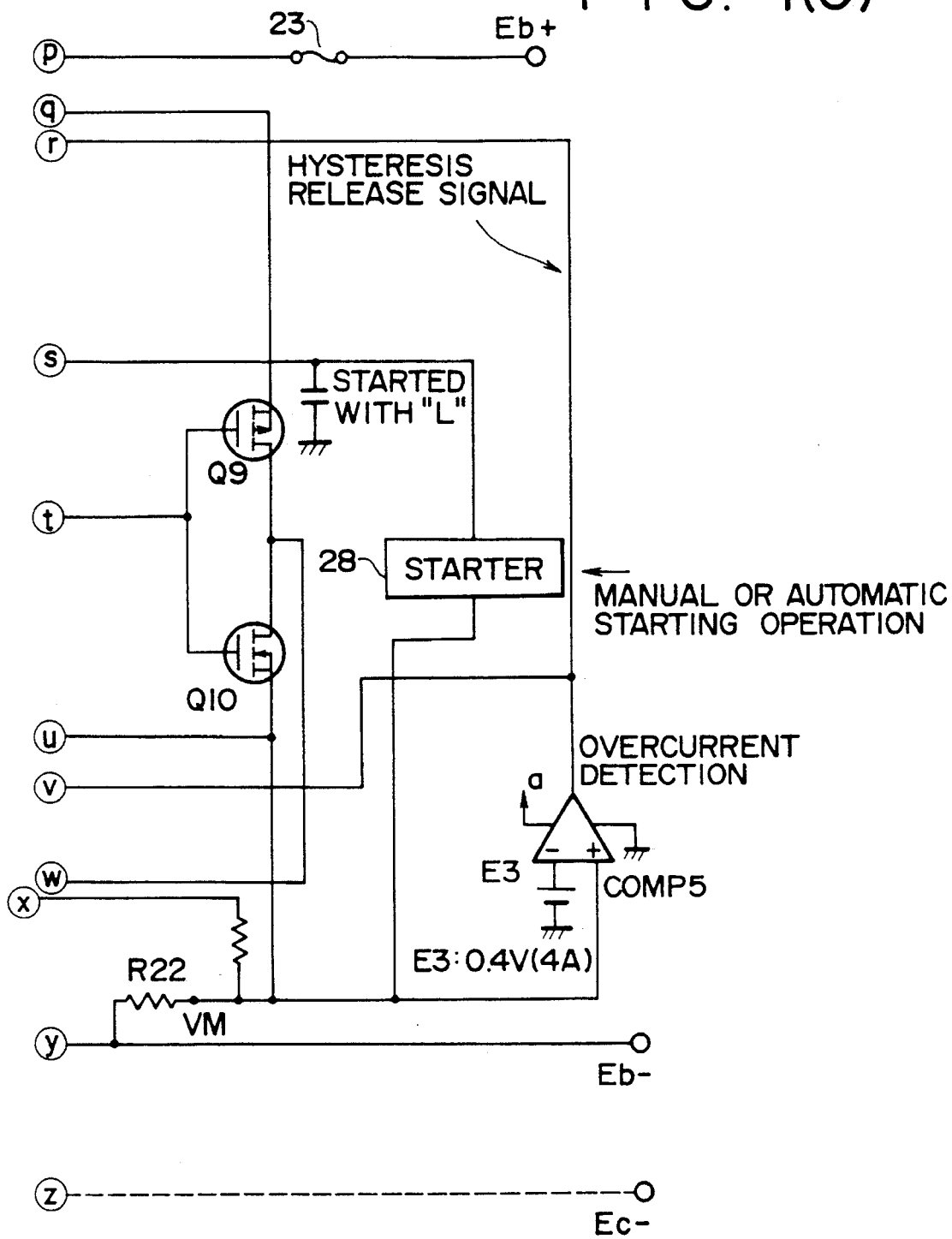
Figure 7:
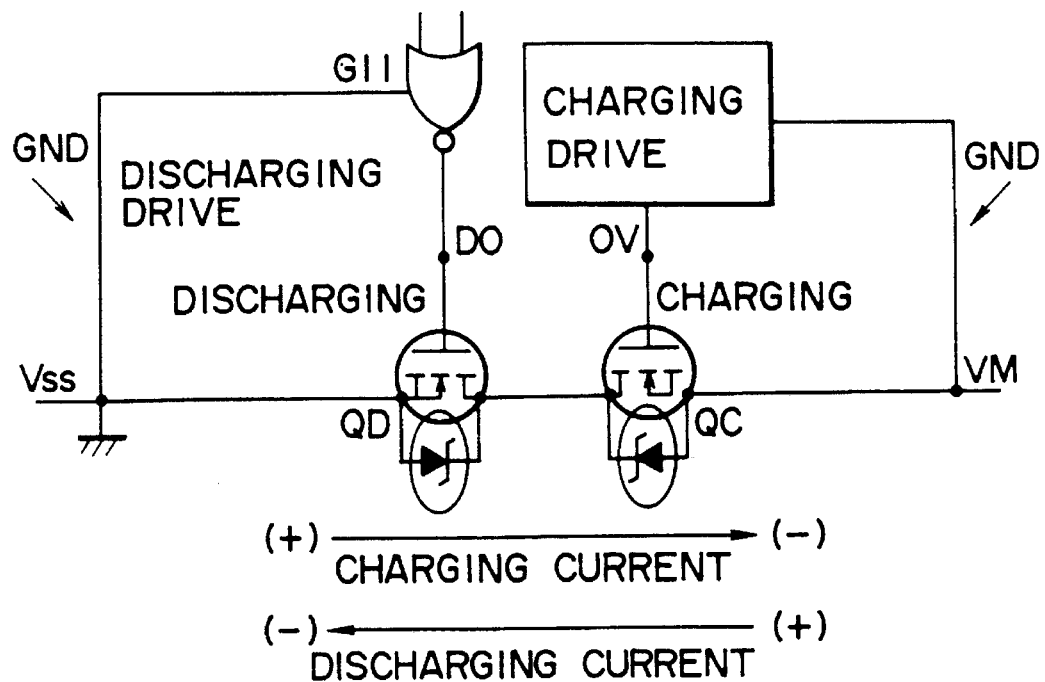
FIG. 7 is a circuit diagram showing the manner in which power MOS transistors are grounded.

(h) Ground level shifter:

The ground level shifter will be described below with reference to FIGS. 7 and 8. The ground level shifter serves to shift the potential at the source terminal of the power NMOS transistor QD, which is a discharging-side ground level (potential at the ground terminal VSS), and the potential at the source terminal of the power NMOS transistor QC, which is a charging-side ground level (potential at the terminal VM), to the same potential. FIG. 7 shows a charging/discharging circuit composed mainly of the power NMOS transistors QD, QC in the circuit arrangement shown in FIG. 3 (FIG. 4 for the 2nd embodiment). The charging power NMOS transistor QC and the discharging power NMOS transistor QD cannot fully be turned off unless 0 V is applied with respect to the potentials at the terminals VM, VSS, respectively.

To eliminate the above drawback, a resistor is added to the charging logic circuit to add a ground level shifting function. Such a ground level shifting function will be described in detail below with reference to FIG. 8. In FIG. 8, MOS transistors QP, QN correspond to the MOS transistors Q9, Q10 connected to the charging logic circuit shown in FIG. 3, and a resistor R is connected between the MOS transistors QP, QN.

When the potential at the terminal VSS, represented by a point x, is an L-level signal, if the potential at the terminal VM is the same as the potential at the terminal VSS, then the MOS transistor QP is turned on, and the MOS transistor QN is turned off. An OUT signal is of an H level, posing no problem.

If the potential at the terminal VM were lowered (always so during charging) without the resistor R connected, then the MOS transistor QN would also be turned on as well as the MOS transistor QP. Therefore, a short circuit would be developed between the MOS transistors QP, QN, causing the OUT signal to be indefinite in level. Another problem is that a short-circuiting current would flow between the MOS transistors QP, QN.

Figure 8:
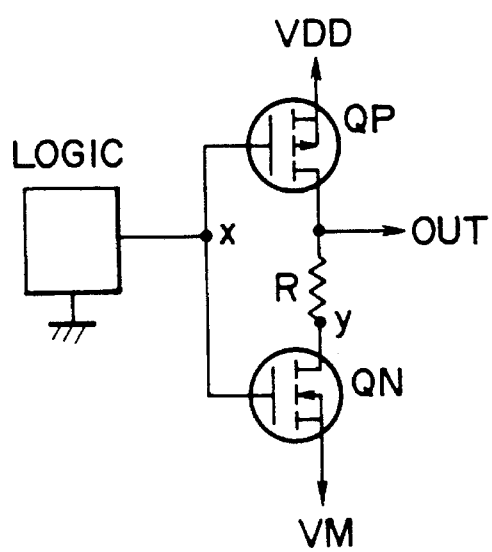
FIG. 8 is a circuit diagram illustrative of a ground level shift which shifts ground levels shown in FIG. 7 to the same potential.

With the resistor R connected between the MOS transistors QP, QN, as shown in FIG. 8, when the MOS transistor QN is turned on, the potential at a y point is of an L level, but the OUT signal is maintained at the H level. Since a short-circuiting current flows through the resistor R, it is necessary that the resistor R have a resistance ranging from several K ohms to several M ohms. The short-circuiting current flows only during charging. When the potential at the x point is of an H level, the OUT signal remains to be of an L level (i.e., the potential at the terminal VM) irrespective of whether the potential at the terminal VM is lowered or increased.

(i) Circuit in the power-down mode:

When the power-down mode is initiated, the power supply of the comparators is turned off, and their output signals would be undefined. To avoid this condition, the output signals from the comparators are separated and are of necessary signal statuses. The overcharging detecting signal is kept at an L level, the overdischarging detecting signal at an H level, and the overcurrent detecting signal at an L level, making it possible to control the circuit including MOS transistors, etc. with the power-down signal. The NMOS transistor Q13 of a constant-current circuit serves to reduce the voltage at the terminal VM to 0 V when no load is connected, and is naturally turned off in the power-down mode.

The resistors R10, R11, R12, R13, R22 connected to the terminals VDD, CPU, CPD, VSS, VM, respectively, are protective resistors, which basically do not develop potential differences.

(2) 2nd embodiment:

A battery protection circuit according to a second embodiment of the present invention is similar to the battery protection circuit shown in FIG. 3 except that a balancing circuit is added to the overcharging and overdischarging detecting circuits as shown in FIG. 4. The added circuit components will be described below while the other circuit components will not be described as they are identical to the corresponding circuit components shown in FIG. 3.

The output terminal of the comparator COMP1 is connected to input terminals of an AND gate G11, an inverter G12, and an OR gate G2.

The output terminal of the comparator COMP2 is connected to input terminals of an OR gate 14 and a NOR gate G8.

The output terminal of the comparator COMP3 is connected to input terminals of the OR gate G2 and an inverter G15.

The output terminal of the comparator COMP4 is connected to input terminals of the NOR gate G8 and a NOR gate G17.

The AND gate G11 has two input terminals and one output terminal. One input terminal of the AND gate G11 is connected to the output terminal of the comparator COMP1, and the other input terminal of the AND gate G11 is connected to the output terminal of the comparator COMP3. The output terminal of the AND gate G11 is coupled to one of the input terminals of the NAND gate G4.

The inverter G12 has its input terminal connected to the output terminal of the comparator COMP1 and its output terminal connected to one input terminal of the AND gate G13.

An AND gate G13 has two input terminals and one output terminal. One input terminal of the AND gate G13 is connected to the output terminal of the inverter G11, and the other input terminal of the AND gate G13 is connected to the output terminal of the comparator COMP3. The output terminal of the AND gate G13 is coupled to one of the input terminals of the OR gate G14.

The OR gate G14 has two input terminals and one output terminal. One input terminal of the OR gate G14 is connected to the output terminal of the AND gate G13, and the other input terminal of the OR gate G14 is connected to the output terminal of the comparator COMP2. The output terminal of the OR gate G14 is coupled to the gate terminal of the NMOS transistor Q14.

The inverter G15 has its input terminal connected to the output terminal of the comparator COMP3 and its output terminal connected to one input terminal of the AND gate G16.

An AND gate G16 has two input terminals and one output terminal. One input terminal of the AND gate G16 is connected to the output terminal of the comparator COMP1, and the other input terminal of the AND gate G16 is connected to the output terminal of the inverter G15. The output terminal of the AND gate G16 is coupled to one of the input terminals of the NOR gate G17.

The NOR gate G17 has two input terminals and one output terminal. One input terminal of the NOR gate G17 is connected to the output terminal of the AND gate G16, and the other input terminal of the NOR gate G17 is connected to the output terminal of the comparator COMP4. The output terminal of the NOR gate G17 is coupled to the gate terminal of the PMOS transistor Q15.

The NMOS transistor Q14 is a transistor having source, gate, and drain terminals. The source terminal is connected to the terminal VC, and the gate terminal is connected to the output terminal of the OR gate G14. The drain terminal is connected through the resistor R11 to the terminal CPU.

The PMOS transistor Q15 is a transistor having source, gate, and drain terminals. The source terminal is connected to the terminal VC, and the gate terminal is connected to the output terminal of the NOR gate G17. The drain terminal is connected through the resistor R12 to the terminal CPD.

The battery protection circuit according to the second embodiment differs from the battery protection circuit according to the first embodiment in that a circuit for keeping a balanced condition achieved by overdischarging detection is effected by the comparators COMP1, COMP3. Therefore, when both the cells Abat, Bbat are overdischarged (both input terminals of the AND gate G4 are supplied with signals), the battery protection circuit can enter the power-down mode.

When the battery protection circuit actually enters the power-down mode, the power supply is cut off by power-down switches PDSW associated with the comparators COMP1–COMP5, the ladder resistors, and the negative (ground) terminals of the sources of reference voltages. Since operation of the battery protection circuit according to the second embodiment is essentially the same as the operation of the battery protection circuit according to the first embodiment, it can readily be understood from the above description of the operation of the battery protection circuit according to the first embodiment.

(3) 3rd embodiment:

According to a third embodiment of the present invention, as shown in FIGS. 3 and 4, in the case where the charging terminals are composed of the positive and negative terminals Eb+, Eb–, the discharging terminals are composed of the positive and negative terminals Eb+, Ec–. Therefore, the charging terminals and the discharging terminals are physically separate from each other thereby to eliminate faults upon charging and discharging.

In the third embodiment, the charging current flows both through the power MOS transistor QC and the power MOS transistor QD. However, the discharging current flows only through the power MOS transistor QD, so that any loss due to the internal resistance of the power MOS transistors is reduced.

The battery protection circuit may be arranged such that the charging current flows only through the power MOS transistor QC and the discharging current flows only through the power MOS transistor QD.

Figure 9A:
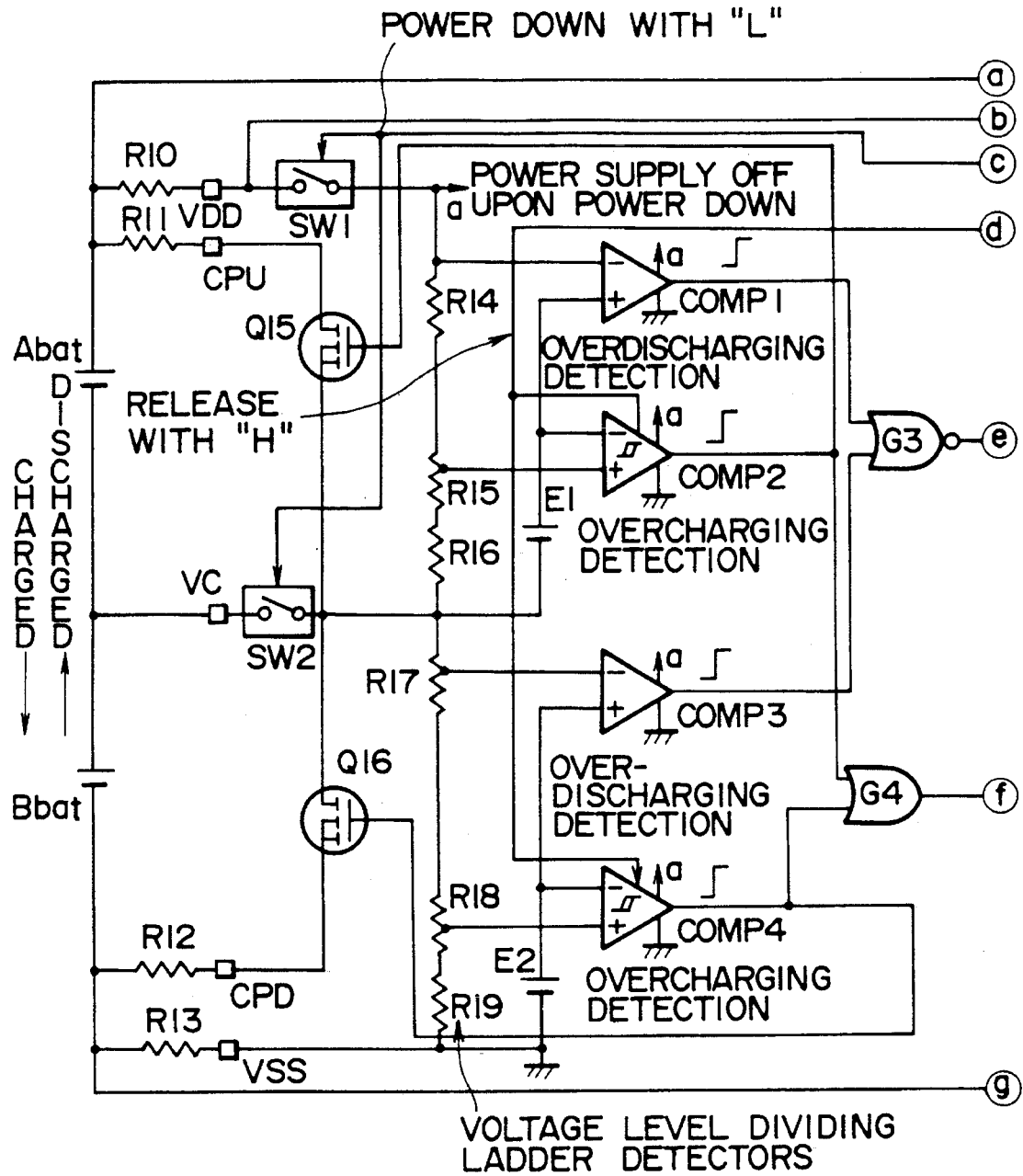
FIG. 9 is a detailed circuit diagram of a battery protection circuit according to a fourth embodiment of the present invention.
Figure 9B:
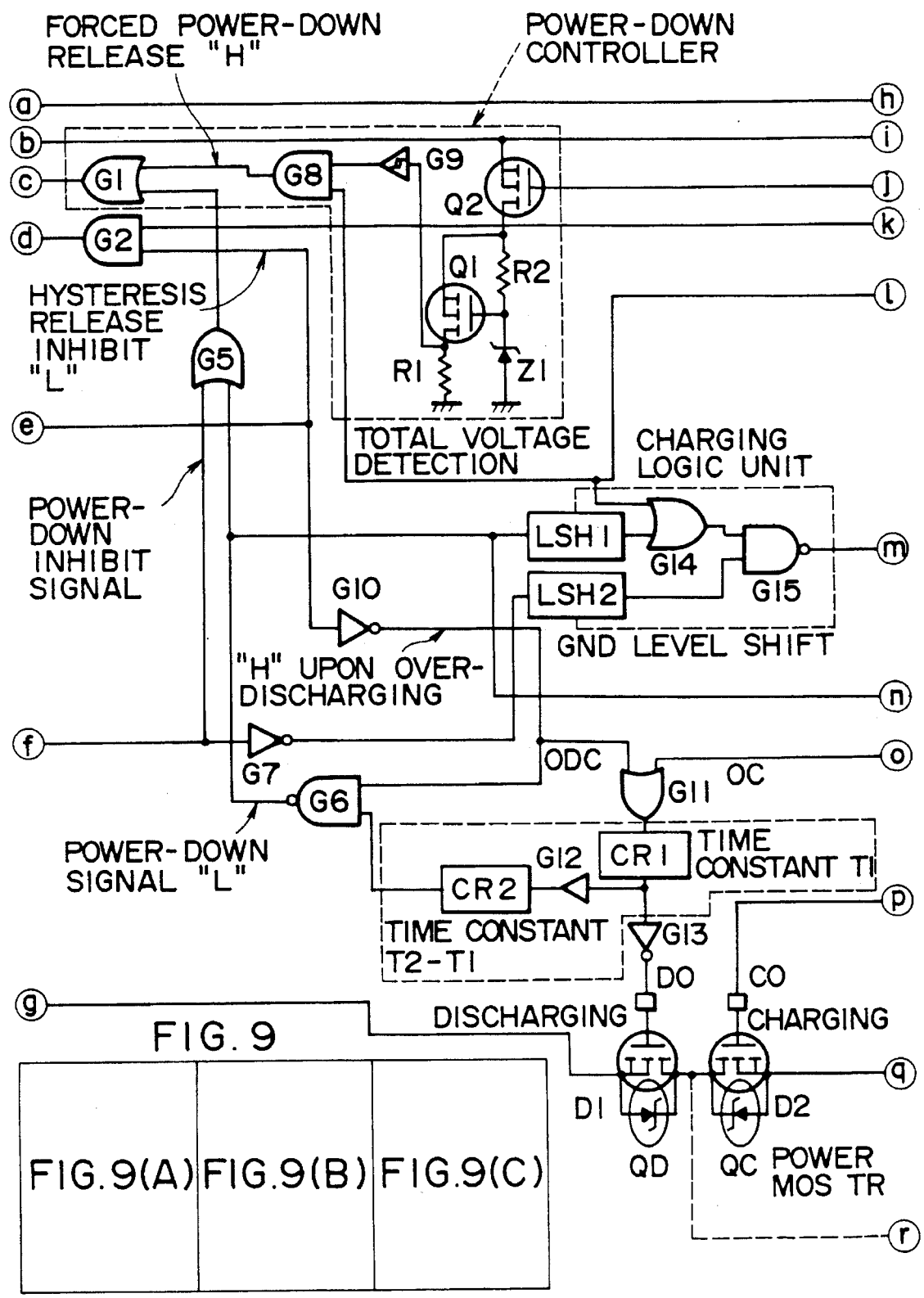
Figure 9C:
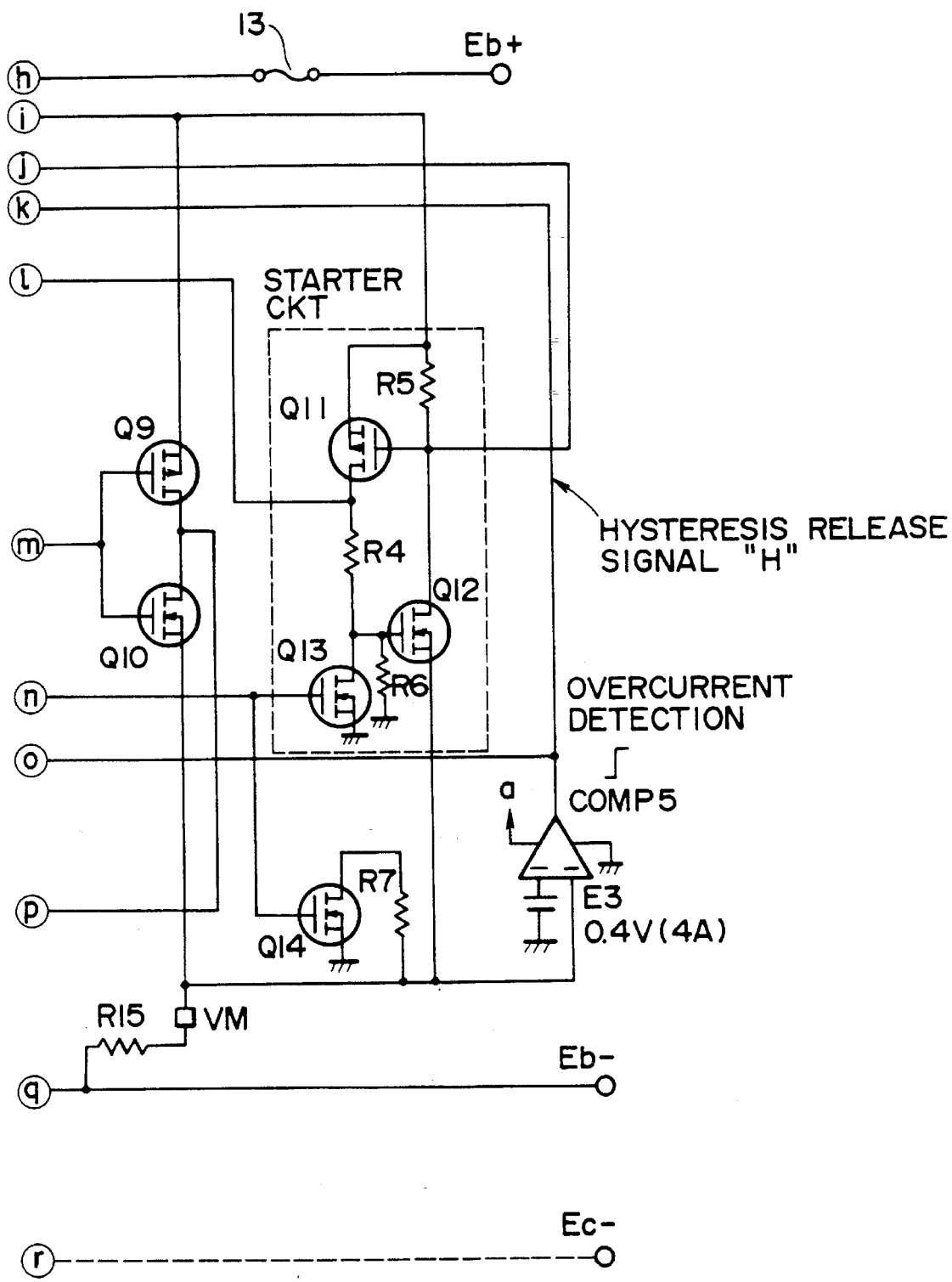

(4) 4th embodiment:

<1> Circuit arrangement of the 4th embodiment:

The circuit arrangement of a battery protection circuit according to a fourth embodiment of the present invention will be described below with reference to FIG. 9. As shown in FIG. 9, the battery protection circuit mainly comprises a plurality of comparators, a plurality of MOS transistors, and a plurality of various gates, which are connected as follows:

A battery combined with the battery protection circuit is composed of a cell Abat and a cell Bbat that are connected in series with each other. A positive connection terminal Eb+ which is connected to the positive terminal of a charger or a load is connected to the positive terminal of the cell Abat through a fuse 13, and the negative terminal of the cell Abat is connected to the positive terminal of the cell Bbat.

The negative terminal of the cell Bbat is connected to a negative connection terminal Eb− connected to the negative terminal of the charger or the load through a discharging power N-channel MOS (NMOS) transistor QD and a charging power NMOS transistor QC. The power NMOS transistor QD has a gate terminal connected to a terminal DO, and power NMOS transistor QC has a gate terminal connected to a terminal CO.

The positive terminal of the cell Abat is connected through a resistor R10 to a terminal VDD and also through a resistor R11 to a terminal CPU. The junction between the cell Abat and the cell Bbat is connected to a terminal VC. The negative terminal of the cell Bbat is connected through a resistor R12 to a terminal CPD, through a terminal R13 to a terminal VSS, and through a resistor R15 and transistors QD, QC to a terminal VM.

An analog switch SW1 is a switch with a control terminal, and has one terminal connected to the terminal VDD and the other terminal to the junction a between one terminal of a resistor R14 and the negative input terminal of a comparator COMP1. The junction a is connected to a power supply for comparators COMP1~5. The control terminal of the analog switch SW1 is coupled to the output terminal of an OR gate G1. The junction between the terminal VDD and the analog switch SW1 is connected to the source terminals of PMOS transistors Q2, Q9, Q11 and one terminal of a resistor R5.

An analog switch SW2 is a switch with a control terminal, and has one terminal connected to the terminal VC and the other terminal to the source terminal of an NMOS transistor Q15, the drain terminal of an NMOS transistor Q16, one terminal of a resistor R16, a terminal of a resistor R17, and a negative terminal of a source of a reference voltage E1. The control terminal of the analog switch SW2 is connected to the output terminal of the OR gate G1.

Each of the comparators COMP1~COMP5 has two input terminals and one output terminal. A negative input terminal of the comparator COMP1 is connected to the junction between one of the terminals of the analog switch SW1 and a terminal of a resistor R14. A positive input terminal of the comparator COMP1 is connected to a positive terminal of the source of the reference voltage El. The output terminal of the comparator COMP1 is connected to an input terminal of a NOR gate G3.

A negative input terminal of the comparator COMP2 is connected to the positive terminal of the source of the reference voltage E1. A positive input terminal of the comparator COMP2 is connected to the junction between the other terminal of the resistor R14 and a terminal of a resistor R15. The output terminal of the comparator COMP2 is connected to an input terminal of an OR gate G4 and the gate terminal of the NMOS transistor Q15. The other terminal of the resistor R15 is connected to the other terminal of the resistor R16, with its one terminal connected through the analog switch SW2 to the terminal VC.

A negative input terminal of the comparator COMP3 is connected to the terminal VC through the junction between the resistors R16, R17 and the analog switch SW2. A positive input terminal of the comparator COMP3 is connected to a positive terminal of a source of a reference voltage E2. The output terminal of the comparator COMP3 is connected to the other input terminal of the OR gate G3. The other terminal of the resistor R17 is connected to a terminal of a resistor R18 whose other terminal is coupled to a terminal of a resistor R19. The other terminal of the resistor R19 is connected to the terminal VSS.

A negative input terminal of the comparator COMP4 is connected to the positive terminal of the source of the reference voltage E2. A positive input terminal of the comparator COMP4 is connected to the junction between the resistors R18, R19. The output terminal of the comparator COMP4 is connected to the other input terminal of the OR gate G4 and the gate terminal of the NMOS transistor Q16.

A negative input terminal of the comparator COMP5 is connected to a positive terminal of a source of a reference voltage E3. A positive input terminal of the comparator COMP5 is connected to the terminal VM. The output terminal of the comparator COMP5 is connected to an input terminal of an OR gate G11 and an input terminal of an AND gate G2. The source of the reference voltage E3 has its negative terminal grounded.

The power NMOS transistor QD has source, gate, and drain terminals and a parasitic diode D1. The source terminal is connected to the negative terminal of the cell Bbat. The gate terminal is connected to the terminal DO, and the drain terminal is connected to the drain terminal of the power NMOS transistor QC.

The power NMOS transistor QC is a transistor having source, gate, and drain terminals and a parasitic diode D2. The source terminal is connected to the negative terminal Eb−. The gate terminal is connected to the terminal CO, and the drain terminal is connected to the drain terminal of the power NMOS transistor QD. The negative terminal Eb− is coupled through the protective resistor R15 to the terminal VM. A terminal Ec− for distinguishing charging and discharging circuits from each other may be connected to an intermediate junction between the drain terminal of the power NMOS transistor QD and the drain terminal of the power NMOS transistor QC.

Each of MOS transistors Q1, Q2, Q9~Q16 is a switching element having source, drain, and gate terminals. The source terminal of the PMOS transistor Q1 is connected to a terminal of a resistor R2 and the drain terminal of the PMOS transistor Q2. The drain terminal of the PMOS transistor Q1 is connected to a terminal of a resistor R1 and an input terminal of an OR gate G9, and the gate terminal thereof is connected to the other terminal of the resistor R2 and a terminal of a zener diode Z1 having a zener value of 3 V. The other terminal of the resistor R1 and the other terminal of the zener diode Z1 are grounded.

The source terminal of the PMOS transistor Q2 is connected to the terminal VDD, and the drain terminal thereof is connected to the junction between the source terminal of the PMOS transistor Q1 and the resistor R2. The gate terminal of the PMOS transistor Q2 is connected to the junction between the resistor R5 of a starter, the gate terminal of the PMOS transistor Q11, and the drain terminal of an NMOS transistor Q12.

The source terminal of the PMOS transistor Q9 is connected to the terminal VDD, and the drain terminal thereof is connected through the drain terminal of an NMOS transistor Q10 and the terminal CO to the gate terminal of the power NMOS transistor QC. The gate terminal of the PMOS transistor Q9 is connected to the junction between the output terminal of a NAND gate G15 and the gate terminal of the NMOS transistor Q10.

The source terminal of the NMOS transistor Q10 is connected to the terminal VM, and the drain terminal thereof is connected through the drain terminal of the PMOS transistor Q9 and the terminal CO to the gate terminal of the power NMOS transistor QC. The gate terminal of the NMOS transistor Q10 is connected to the junction between the output terminal of the NAND gate G15 and the gate terminal of the PMOS transistor Q9.

The source terminal of the PMOS transistor Q11 is connected to the junction between the terminal VDD and the resistor R5, and the drain terminal thereof is connected to an input terminal of an AND gate G8, an input terminal of an OR gate G14 of a charging logic circuit, and a terminal of a resistor R4. The gate terminal of the PMOS transistor Q11 is connected to the junction between the other terminal of the resistor R5, the drain terminal of the NMOS transistor Q12, and the gate terminal of the PMOS transistor Q2.

The source terminal of the NMOS transistor Q12 is connected to the terminal VM, and the drain terminal thereof is connected to the junction between the gate terminal of the PMOS transistor Q11, the other terminal of the resistor R5, and the gate terminal of the PMOS transistor Q2. The gate terminal of the PMOS transistor Q12 is connected to the junction between one terminal of a resistor R6, the other terminal of the resistor R4, and the drain terminal of the NMOS transistor Q13. The other terminal of the resistor R6 is grounded.

The source terminal of the NMOS transistor Q13 is grounded, and the drain terminal thereof is connected to the junction between the resistor R6, the gate terminal of the NMOS transistor Q12, and the resistor R4. The gate terminal of the NMOS transistor Q13 is connected to the output terminal of a NAND gate G6.

The source terminal of the NMOS transistor Q14 is grounded, and the drain terminal thereof is connected to a terminal of a resistor R7. The gate terminal of the NMOS transistor Q14 is connected to the output terminal of the NAND gate G6. The other terminal of the resistor R7 is connected to the terminal VM.

The source terminal of the NMOS transistor Q15 is connected to the terminal VC through the analog switch SW2, and the drain terminal thereof is connected to the terminal CPU. The gate terminal of the NMOS transistor Q15 is connected to the output terminal of the comparator COMP2.

The source terminal of the NMOS transistor Q16 is connected to the terminal CPD, and the drain terminal thereof is connected to the terminal VC through the analog switch SW2. The gate terminal of the NMOS transistor Q16 is connected to the output terminal of the comparator COMP4.

The OR gate G1 has two input terminals and one output terminal. One input terminal of the OR gate G1 is connected to the output terminal of the AND gate G8, and the other input terminal of the OR gate G1 is connected to the output terminal of an OR gate G5. The output terminal of the OR gate G1 is connected to the control terminals of the analog switches SW1, SW2.

The AND gate G2 has two input terminals and one output terminal. One input terminal of the AND gate G2 is connected to the output terminal of the comparator COMP5, and the other input terminal of the AND gate G2 is connected to the output terminal of the NOR gate G3. The output terminal of the AND gate G2 is connected to hysteresis input terminals of the comparators COMP2, COMP4.

The NOR gate G3 has two input terminals and one output terminal. One input terminal of the NOR gate G3 is connected to the output terminal of the comparator COMP1, and the other input terminal of the NOR gate G3 is connected to the output terminal of the comparator COMP3. The output terminal of the NOR gate G3 is connected to one of the input terminals of the AND gate G2 and the input terminal of an inverter G10.

The OR gate G4 has two input terminals and one output terminal. One input terminal of the OR gate G4 is connected to the output terminal of the comparator COMP2, and the other input terminal of the OR gate G4 is connected to the output terminal of the comparator COMP4. The output terminal of the OR gate G4 is connected to the junction between an input terminal of the OR gate G5 and the input terminal of an inverter G7.

The OR gate G5 has two input terminals and one output terminal. One input terminal of the OR gate G5 is connected to the output terminal of the OR gate G4, and the other input terminal of the OR gate G5 is connected to the output terminal of the NAND gate G6. The output terminal of the OR gate G5 is connected to one of the input terminals of the OR gate G1.

The NAND gate G6 has two input terminals and one output terminal. One input terminal of the NAND gate G6 is connected to the output terminal of the inverter G10, and the other input terminal of the NAND gate G6 is connected to the output terminal of a time constant circuit CR2. The output terminal of the NAND gate G6 is connected to the junction between one of the input terminals of the OR gate G5 and the input terminal of a ground level shifter LSH1 of the charging logic circuit.

The inverter G7 has its input terminal connected to the output terminal of the OR gate G4 and its output terminal to the input terminal of a ground level shifter LSH2 of the charging logic circuit.

The AND gate G8 has two input terminals and one output terminal. One input terminal of the AND gate G8 is connected to the output terminal of the OR gate G9 which has a buffer with an input hysteresis, and the other input terminal of the AND gate G8 is connected to the junction between the drain terminal of the PMOS transistor Q11 and the resistor R4. The output terminal of the AND gate G8 is connected to one of the input terminals of the OR gate G1.

The OR gate G9 has its input terminal connected to the junction between the drain terminal of the PMOS transistor Q1 and the resistor R1, and its output terminal to one of the input terminals of the AND gate G8.

The inverter G10 has its input terminal connected to the output terminal of the NOR gate G3 and its output terminal connected to one of the input terminals of the NAND gate G6 and one of the input terminals of the OR gate G11.

The OR gate G11 has two input terminals and one output terminal. One input terminal of the OR gate G11 is connected to the output terminal of the inverter G10, and the other input terminal of the OR gate G11 is connected to the output terminal of the comparator COMP5. The output terminal of the OR gate G11 is connected to the input terminal of a time constant circuit CR1.

An inverter G13 has its input terminal connected to the output terminal of the time constant circuit CR1 and its output terminal connected through the terminal DO to the gate terminal of the power NMOS transistor QD.

The OR gate G14 has two input terminals and one output terminal. One input terminal of the OR gate G14 is connected to the junction between the drain terminal of the PMOS transistor Q11 and the resistor R4, and the other input terminal of the OR gate G14 is connected to the output terminal of the ground level shifter LSH1. The output terminal of the OR gate G14 is connected to one of the input terminals of the NAND gate G15.

The NAND gate G15 has two input terminals and one output terminal. One input terminal of the NAND gate G15 is connected to the output terminal of the OR gate G14, and the other input terminal of the NAND gate G15 is connected to the output terminal of the ground level shifter LSH2. The output terminal of the NAND gate G15 is connected to the gate terminal of the PMOS transistor Q9 and the gate terminal of the NMOS transistor Q10.

The ground level shifter LSH1 has its input terminal connected to the output terminal of the NAND gate G6 and its output terminal to one of the input terminals of the OR gate G14.

The ground level shifter LSH2 has its input terminal connected to the output terminal of the inverter G7 and its output terminal to one of the input terminals of the NAND gate G15.

The time constant circuit CR1 generates a signal having a predetermined time duration T1 in the power-down mode, and is made up of a combination of a capacitor and a resistor. The input terminal of the time constant circuit CR1 is connected to the output terminal of the OR gate G11, and the output terminal thereof is connected to the input terminal of the OR gate G12 and the input terminal of the inverter G13.

The time constant circuit CR2 generates a signal having a predetermined time duration (T2−T1) in the power-down mode, and is made up of a combination of a capacitor and a resistor. The input terminal of the time constant circuit CR2 is connected to the output terminal of the OR gate G12, and the output terminal thereof is connected to one of the input terminals of the OR gate G6.

<2> Operation of the 4th embodiment:

Operation of the battery protection circuit of the above circuit arrangement will be described below.

In the case where the charging terminals are composed of the positive and negative terminals Eb+, Eb−, the discharging terminals may be composed of the positive and negative terminals Eb+, Ec−. Therefore, the charging terminals and the discharging terminals can be physically separate from each other thereby to eliminate faults upon charging and discharging.

(a) Charging and overcharging:

When the secondary cells Abat, Bbat are charged, a charging current flows from the positive terminal Eb+, which is connected to an external charger or a load with respect to which the cells are discharged, through the secondary cells Abat, Bbat and the power NMOS transistors QD, QC to the negative terminal Eb−.

The charging current is checked by monitoring an overcharging voltage as of 4.4 V with an overcharging detecting circuit composed mainly of the comparator COMP2. When an overcharged condition is detected, the comparator COMP2 outputs an H-level signal from its output terminal, and an L-level signal is applied through the NOR gate G4 and the inverter G7 to the input terminal of the ground level shifter LSH2 of the charging logic circuit.

The ground level shifter LSH2 shifts the ground level of the L-level signal, applying an L-level signal to the NAND gate G15, which then outputs an H-level signal. The PMOS transistor Q9 is turned off, and the NMOS transistor Q10 is turned on, applying an L-level signal to the terminal CO, whereupon the power NMOS transistor QC is turned off, thus cutting off the charging current.

At the same time, to prevent the comparator COMP2 from being immediately reset to a charging condition due to a voltage drop across the cells upon stoppage of the charging, the AND gate G2 applies an H-level signal to the hysteresis switch input terminals of the comparators COMP2, COMP4 provided the cells are not overdischarged and no overcurrent is detected.

The hysteresis in the comparator COMP2 is achieved by changing the comparison voltage generated by the ladder resistors and applied to the positive input terminal of the comparator COMP2 from a comparison voltage V1 as of 4.4 V to a comparison voltage V2 as of 4.2 V for thereby varying the comparing operation of the comparator COMP2.

Since the comparison voltage V2 is set to a value higher than the reference voltage E1, charging is not immediately started again when the voltage across the cell Abat is lowered after the charging current is cut off. Consequently, the battery protection circuit can be prevented from immediately operating to start charging the cells again by giving a hysteresis interval voltage margin as of 0.2 V to the comparators COMP2, 4.

Simultaneously, the H-level signal from the output terminal of the comparator COMP2 is applied to the gate terminal of the NMOS transistor Q15 to discharge an overcharging overflow current for thereby protecting the cell Abat. Specifically, when the NMOS transistor Q15 is turned on, an overcharging overflow current flows from the cell Abat through the resistor R11 connected to the positive terminal of the cell Abat, thus discharging the cell Abat to a voltage of 4.2 V which is lower by the hysteresis interval.

When the cell Abat is discharged to a cell voltage of 4.2 V, for example, the level of the signal from the output terminal of the comparator COMP2 changes from the H level to the L level. The power NMOS transistor QC is turned on to start charging the cell Abat again, and at the same time the NMOS transistor Q15 is turned off to stop discharging the overflow current from the battery. Discharging the battery from an overcharged condition will be described later on.

(b) Changing from a discharged condition to an overdischarged condition, and entering the power-down mode after the overdischarged condition is detected:

The cells Abat, Bbat are discharged by connecting a load between the positive and negative terminals Eb+, Eb−. The discharged condition is monitored by an overdischarging detecting circuit composed mainly of the comparator COMP1 at all times. When a discharged condition continues and the voltage across the cell Abat reaches an overdischarged voltage of 2.4 V, for example, the output terminal of the comparator COMP1 outputs an H-level signal. An H-level signal is applied through the NOR gate G3 and the inverter G10 to one of the input terminals of the NAND gate G6, which outputs an L-level power-down signal from its output terminal. The battery protection circuit now enters the power-down mode. The output terminal of the inverter G10 is connected to the other input terminal of the NAND gate G6 through the OR gate G11, the time constant circuit CR1, the OR gate G12 with an input buffer, and the time constant circuit CR2. Therefore, the output terminal of the NAND gate G6 does not immediately outputs an L-level signal, but produces an L-level signal after elapse of a time T1+T2, whereupon a power-down signal is output. The power-down signal is applied through the OR gate G5 to the OR gate G1, opening the analog switches SW1, SW2.

When the analog switch SW1 is opened, the power supply connected to the terminals a of the comparators COMP1~5 is turned off. When the analog switch SW2 is opened, the power supplied from the terminal VC is cut off.

Until 0 V is reached after the power supply is turned off in the power-down mode, the L-level signal from the OR gate G1 has to be maintained. Therefore, it is necessary to keep the power-down signal at the L level by adding a minimum circuit for maintaining the power-down mode, e.g., a circuit for turning off the power supply for the NOR gate G3 and the OR gate G4, or adding an AND gate to the output terminals of the OR gate G1 and the NOR gate G3.

Simultaneously, the H-level signal from the output terminal of the comparator COMP1 is applied through the NOR gate G3 to cause the inverter G10 to output an H-level ODC signal from its output terminal. The H-level ODC signal sets the time constant circuit CR1 for the time T1 through the OR gate G11, and is applied to the inverter G13. The output terminal of the inverter G13 applies an L-level signal to the terminal DO, turning off the power NMOS transistor QD to cut off the discharging current.

When the NAND gate G6 outputs an L-level signal, it is applied to the charging logic circuit, and the output terminal thereof which is connected to the terminal CO produces an L-level signal, turning off the power NMOS transistor QC. Since one of the input terminals of the NAND gate G6 is supplied with an H-level signal from the time constant circuits CR1, CR2 after elapse of the time T1+T2, the NAND gate G6 outputs a power-down signal with a corresponding time lag. Therefore, the power NMOS transistor QC is turned off after the power NMOS transistor QD is turned off (after elapse of the time T1+T2).

When the cell voltage drops below a discharged voltage of 2.4 V, for example, the battery protection circuit enters the power-down mode. Thus, it is not necessary to give hysteresis as is the case with the charged condition.

(c) Overcurrent detection:

An overcurrent is detected by a circuit composed mainly of the comparator COMP5 which compares a voltage with the reference voltage E3 (+0.4 V). More specifically, when a potential difference produced by a voltage drop that is developed by the resistance (e.g., a total of 100 mΩ) of the power NMOS transistors QD, QC as they are turned on exceeds the reference voltage E3 (+0.4 V), the output terminal of the comparator COMP5 produces an H-level OC signal. The OC signal is applied through the OR gate G11 to the time constant circuit CR1 and the inverter G13, applying an L-level signal to the terminal DO. The power NMOS transistor QD is turned off, cutting off the discharging current.

When the power NMOS transistor QD is turned off, a high voltage from the positive terminal Eb+ is applied to the terminal VM through the load connected between the positive and negative terminals Eb+, Eb–. The high voltage at the terminal VM is of a value close to the voltage at the terminal Eb+, making it possible to hold the OC signal from the output terminal of the comparator COMP5 at an H level.

When the load connected between the positive and negative terminals Eb+, Eb– is removed, a current of 3 µA, for example, flows through the resistors R15 and R7 to the NMOS transistor Q14, draining the voltage at the terminal VM to about 0 V. The OC signal from the output terminal of the comparator COMP5 can now be brought to an L level, resulting in a recovery from the overcurrent condition.

(d) Discharging from an overdischarged condition:

As described above in (a), since the power NMOS transistor QC is turned off in an overdischarged condition, a discharged current flows through the parasitic diode D2, and the potential at the terminal VM is increased by a voltage of about 0.7 V, for example, developed across the parasitic diode D2 in a forward direction, causing the overcurrent detecting circuit described above in (c) to operate.

When a H-level OC signal is outputted from the output terminal of the overcurrent detecting circuit, insofar as no overdischarged condition (an H-level hysteresis canceling inhibit signal) is detected, the output terminal of the AND gate G2 produces an H-level hysteresis canceling signal if H-level signals are applied to both input terminals of the AND gate G2. The comparators COMP2, COMP4 are released from the hysteresis, and the output signal from the comparator COMP2 changes from the H level to the L level. The L-level signal from the comparator COMP2 is applied to the OR gate G4 and the inverter G7, causing the charging logic circuit to output an H-level signal to the terminal CO. The power NMOS transistor QC is turned on, so that a charging current flows normally.

A certain condition needs to be satisfied in order to start charging the cells by turning on the power NMOS transistor QC. More specifically, if either the cell Abat or the cell Bbat is overdischarged, the hysteresis canceling inhibit signal from the output terminal of the NOR gate G3 is of an L level. Therefore, the hysteresis canceling signal from the output terminal of the AND gate G2 is not of an H level, preventing an analog switch input signal of the comparators COMP2, COMP4 from changing. This is to avoid a drawback such that when either the cell Abat or the cell Bbat is to switch from an overcharged condition to a charged condition, if one of the cells Abat, Bbat is overdischarged, a power-down mode inhibit condition is canceled when the hysteresis is canceled, resulting in the power-down mode, so that an overflow current from the overcharged cell Abat or Bbat is turned off, and the cell Abat or Bbat remains overcharged.

Usually, therefore, when one of the cells Abat, Bbat is overdischarged, the battery protection circuit enters the power-down mode. If the other one is overcharged, the power-down mode is inhibited by the OR gate G5, assuring the flow of an overflow current.

(e) Recovery from the power-down mode:

In the power-down mode, as described above in (b), the analog switches SW1, SW2 are opened, turning off the power NMOS transistors QC, QD.

If a charger is connected between the positive and negative terminals Eb+, Eb– in this condition, the potential at the terminal VM goes negative with respect to the potential at the terminal VSS, allowing the starter (described later on) to operate. At this time, the charging logic circuit (described later on) forcibly starts charging the cells, and a total voltage detecting circuit (described later on) is caused to operate.

(f) Charging logic circuit:

The charging logic circuit starts to charge the cells when an H-level signal is applied from the starter to the OR gate G14. An H-level signal is outputted from the output terminal of the OR gate G14 to one of the input terminals of the NAND gate G15. The other input terminal of the NAND gate G15 is supplied with an H-level signal from the ground level shifter LSH2. Unless the cells are overcharged, the output terminal of the NAND gate G15 output an L-level signal. The PMOS transistor Q9 is turned on, and the NMOS transistor Q10 is turned off. The terminal CO is supplied with an H-level signal, turning on the power NMOS transistor QC to allow a charging current to flow.

As the charging process progresses, the power-down mode is canceled by the total voltage detecting circuit. When the voltage leaves the overdischarged region 18 shown in FIG. 2, the overdischarging detecting circuit composed of the comparators COMP1, 3 outputs an H-level signal, and the starter outputs an L-level signal.

Since the input signal of the ground level shifter LSH1, which is connected to one of the input terminals of the OR gate G14 and applies a signal from the overdischarging detecting circuit, is of an H level, the signal at the terminal CO is maintained at an H level, keeping the power NMOS transistor QC turned on to continue charging the cells.

When the charging process continues and the cells are overcharged, the overcharging circuit composed of the comparators COMP2, COMP4 produces an L-level signal, which is shifted in ground level by the ground level shifter LSH2 and applied to the NAND gate G15, which outputs an H-level signal. The terminal CO is supplied with an L-level signal, turning off the power NMOS transistor QC, cutting off the charging current.

Figure 10:
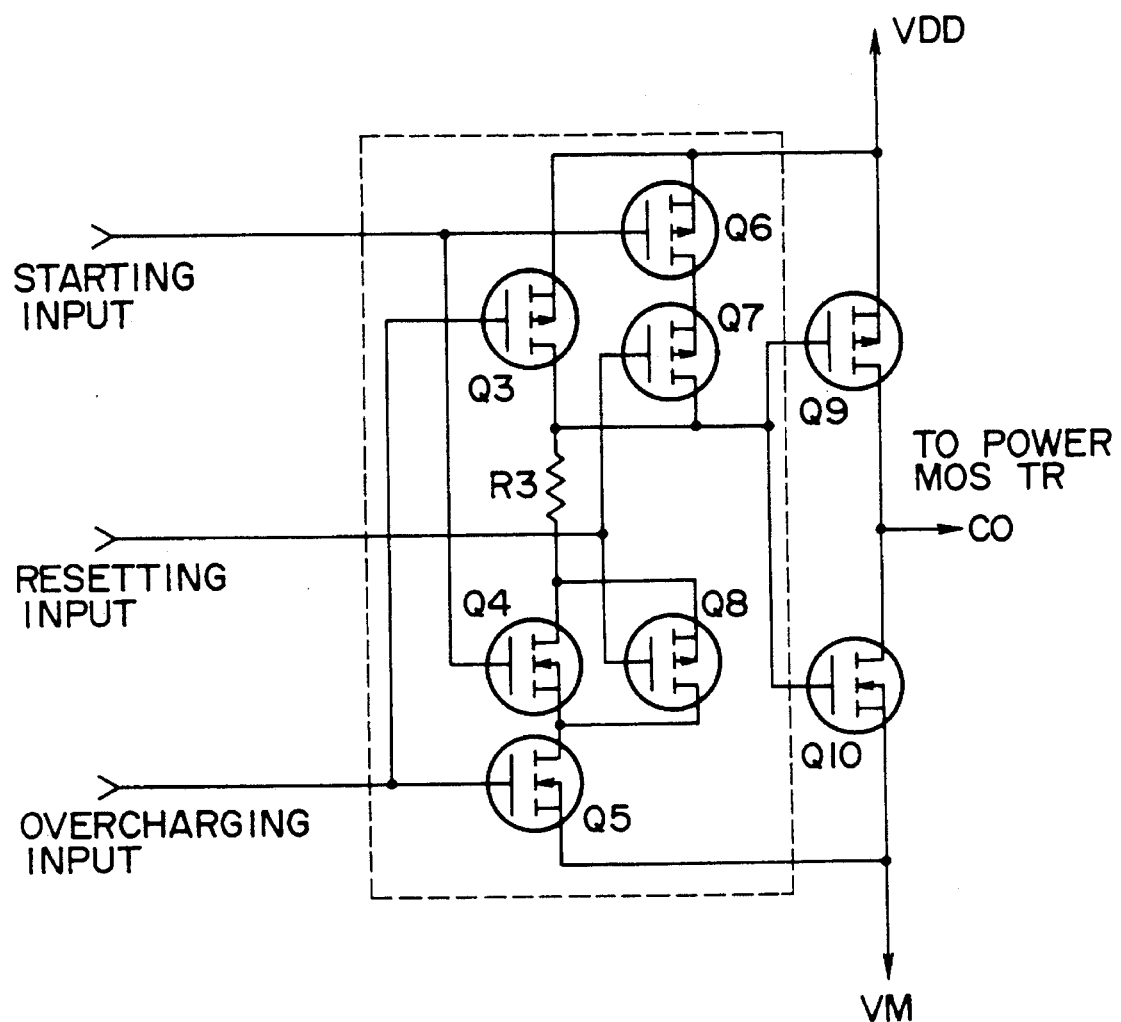
FIG. 10 is a circuit diagram of a charging logic circuit in the battery protection circuit shown in FIG. 9.

FIG. 10 shows the charging logic circuit, which is composed of six MOS transistors. In FIG. 10, one of the input terminals of the OR gate G14 that applies the signal from the starter corresponds to MOS transistors Q4, Q6 (start input). The ground level shifter LSH1 for applying a signal indicative of recovery from the power-down mode and the other input terminal of the OR gate G14 correspond to MOS transistors Q7, Q8 (recovery input). The ground level shifter LSH2 for applying a signal from the overcharging circuit and the NAND gate G15 correspond to MOS transistors Q3, Q5 and Q7, Q8 (overcharging input).

When an H-level start input signal is received from the starter, the MOS transistor Q6 is turned off and the MOS transistor Q4 is turned on. The gate terminals of PMOS and NMOS transistors Q9, Q10 are supplied with an L-level signal, so that the PMOS transistor Q9 is turned on and the NMOS transistor Q10 is turned off. The terminal CO is supplied with an H-level signal, turning on the power NMOS transistor QC to allow a charging current to flow.

Figure 11:
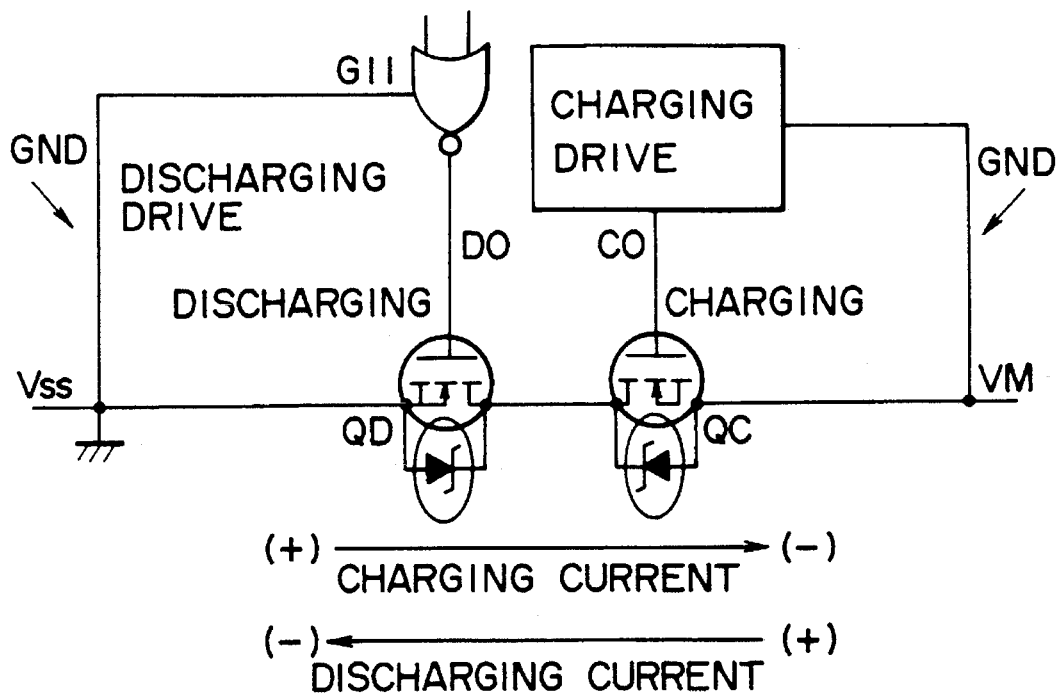
FIG. 11 is a circuit diagram showing the manner in which power MOS transistors are grounded.

(g) Ground level shifter:

The ground level shifter will be described below with reference to FIGS. 11 and 12. The ground level shifter serves to shift the potential at the source terminal of the power NMOS transistor QD, which is a discharging-side ground level (potential at the ground terminal VSS), and the potential at the source terminal of the power NMOS transistor QC, which is a charging-side ground level (potential at the terminal VM), to the same potential. FIG. 11 shows a charging/discharging circuit composed mainly of the power NMOS transistors QD, QC in the circuit arrangement shown in FIG. 9 (FIG. 4 for the 2nd embodiment). The charging power NMOS transistor QC and the discharging power NMOS transistor QD cannot fully be turned off unless 0 V is applied with respect to the potentials at the terminals VM, VSS, respectively.

To eliminate the above drawback, a resistor is added to the charging logic circuit to add a ground level shifting function. Such a ground level shifting function will be described in detail below with reference to FIG. 12. In FIG. 12, MOS transistors QP, QN correspond to the MOS transistors Q9, Q10 connected to the charging logic circuit shown in FIG. 9, and a resistor R is connected between the MOS transistors QP, QN.

When the potential at the terminal VSS, represented by a point x, is an L-level signal, if the potential at the terminal VM is the same as the potential at the terminal VSS, then the MOS transistor QP is turned on, and the MOS transistor QN is turned off. An OUT signal is of an H level, posing no problem.

If the potential at the terminal VM were lowered (always so during charging) without the resistor R connected, then the MOS transistor QN would also be turned on as well as the MOS transistor QP. Therefore, a short circuit would be developed between the MOS transistors QP, QN, causing the OUT signal to be indefinite in level. Another problem is that a short-circuiting current would flow between the MOS transistors QP, QN.

Figure 12:
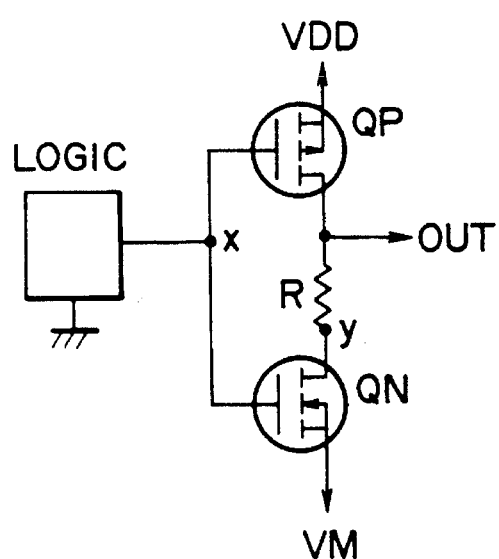
FIG. 12 is a circuit diagram illustrative of a ground level shift which shifts ground levels shown in FIG. 11 to the same potential.

With the resistor R connected between the MOS transistors QP, QN, as shown in FIG. 12, when the MOS transistor QN is turned on, the potential at a y point is of an L level, but the OUT signal is maintained at the H level. Since a short-circuiting current flows through the resistor R, it is necessary that the resistor R have a resistance ranging from several K ohms to several M ohms. The short-cicuiting current flows only during charging. When the potential at the x point is of an H level, the OUT signal remains to be of an L level (i.e., the potential at the terminal VM) irrespective of whether the potential at the terminal VM is lowered or increased.

(h) Starter:

The starter will be described below with reference to FIG. 9. When the potential at the terminal VM drops below a certain voltage, a current flows through the NMOS transistor Q12. A voltage drop developed across the resistor R5 lowers the voltage applied to the gate terminal of the PMOS transistor Q11, rendering the PMOS transistor Q11 conductive.

When the PMOS transistor Q11 is rendered conductive, a more current flows through the resistor R4. An increased voltage across the resistor R4 is applied to the gate terminal of the NMOS transistor Q12, rendering the NMOS transistor Q12 more conductive.

As the voltage applied to the gate terminal of the NMOS transistor Q12 increases, the voltage applied thereto by the resistor R5 increases depending on the condition in which the PMOS transistor Q11 is conductive, thus increasing the current flowing from the NMOS transistor Q12.

Since the PMOS transistors Q11 and the NMOS transistor Q12 are a matched pair, the current supplied from the NMOS transistor Q12 sharply increases. The PMOS transistors Q11 and the NMOS transistor Q12 remain turned on, holding the started condition. The started condition is held until the NMOS transistor Q13 is turned on by a power-down mode signal, i.e., the cells are relieved from an overdischarged condition, or the external charger is disconnected to free the positive and negative terminals Eb+, Eb− whereupon the potential at the terminal VM increases up to the potential at the terminal VDD.

Operation of the battery protection circuit started by the starter for charging the cells from a voltage higher than the circuit operating voltage and for charging the cells through the power NMOS transistor QC from 0 V, for example will be described below with reference to FIGS. 7 through 15.

Figure 13:
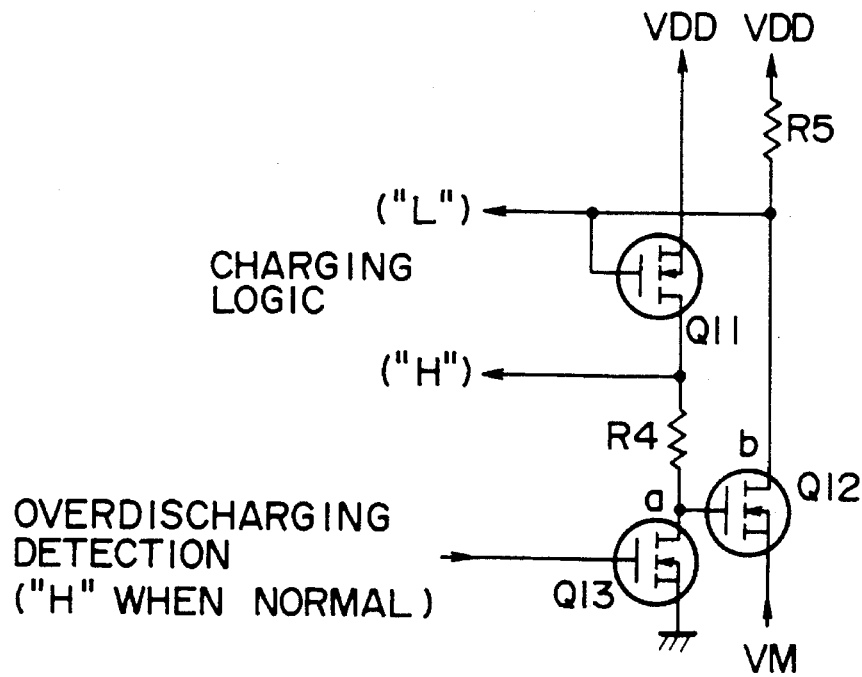
FIG. 13 is a circuit diagram of MOS transistors and related components in a starter in the battery protection circuit shown in FIG. 9.
Figure 14:
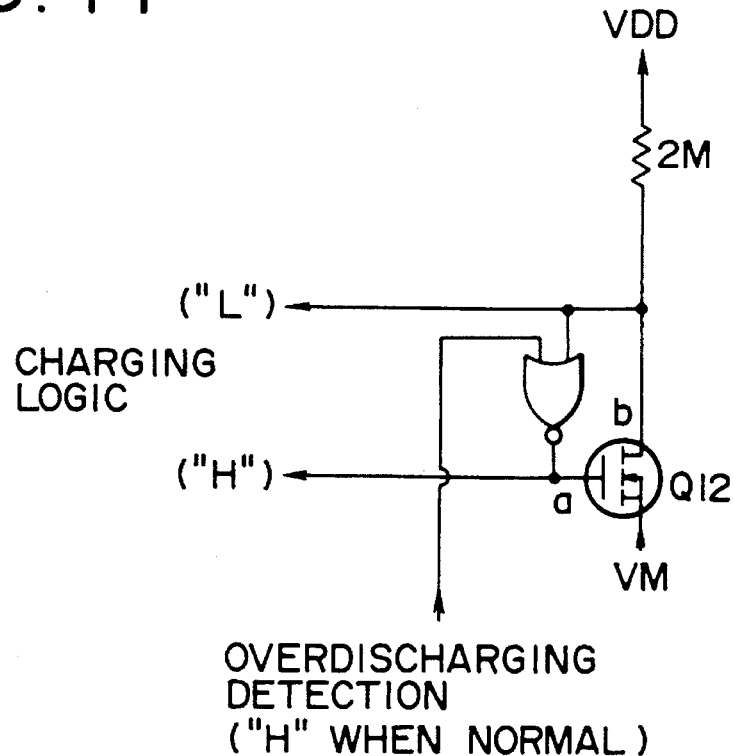
FIG. 14 is a circuit diagram of a logic circuit equivalent to the circuit shown in FIG. 13.
Figure 15:
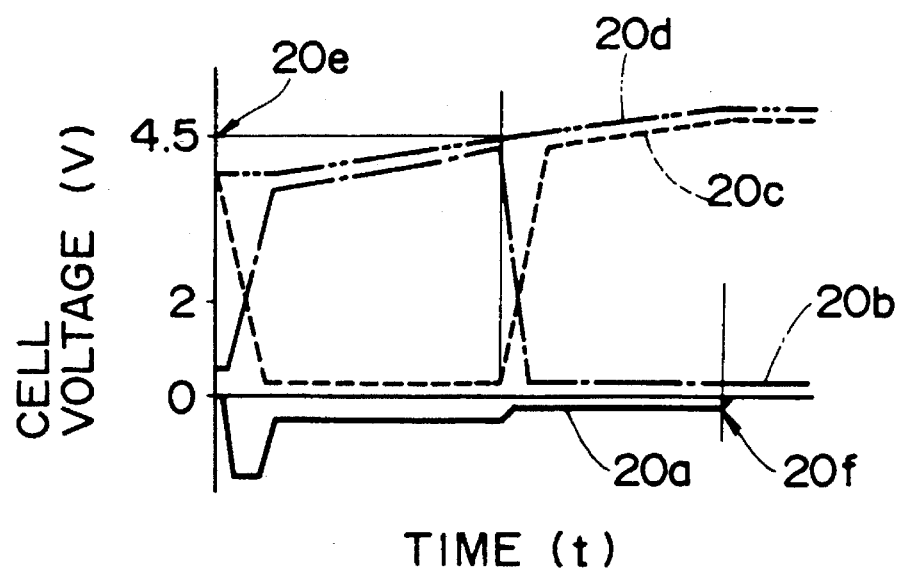
FIG. 15 is a graph showing the manner in which various voltages in the starter vary when the battery is charged from a voltage higher than an operating voltage of a power MOS transistor and the charging is stopped after the battery is relieved of overcharging.

(i) Charging the cells from a voltage higher than the circuit operating voltage:

FIG. 13 shows the starter in the battery protection circuit shown in FIG. 9. In FIG. 13, the starter comprises three MOS transistors, i.e., the PMOS transistor Q11, the NMOS transistor Q12, and the NMOS transistor Q13, and two resistors, i.e., the resistors R4, R5. The circuit arrangement shown in FIG. 13 may be replaced with a logic circuit shown in FIG. 14 to describe its operation. In FIG. 14, the PMOS transistor Q11 and the NMOS transistor Q13 are represented by a NOR gate. FIG. 15 shows a timing relationship of various voltages in the starter as it operates.

Operation of the starter will be described below with reference to FIGS. 14 and 15.

When a voltage $20a$ at the terminal VM drops below a certain voltage, the NMOS transistor Q12 is turned on. A voltage $20b$ at a point a on FIG. 14 quickly rises to an H level, and hence a voltage $20c$ at a point b on FIG. 14 quickly drops to an L level.

When the power NMOS transistor QC is turned on to charge the cells under this condition, the voltage 20a at the terminal VM becomes negative by a voltage drop that is developed across the parasitic diode D1 of the power NMOS transistor QD in a forward direction. As the charging progresses, a voltage 20d across the cells Abat, Bbat rises out of the region of an overdischarged voltage 20e which may be 4.5 V, for example. The power NMOS transistor QD is not turned on, draining the voltage 20a at the terminal VM substantially to 0 V.

When the overcharging detection is effected normally and an H-level signal is produced thereby, the level of the voltage 20b at the point a on FIG. 14 becomes an L level, and the level of the voltage 20c at the point b on FIG. 14 becomes an H level. At this time, the starter returns to its initial state (see FIG. 14). When the charger is removed at 20f, no charging current flows, and the voltage 20a at the terminal VM completely drops to 0 V.

Figure 16:
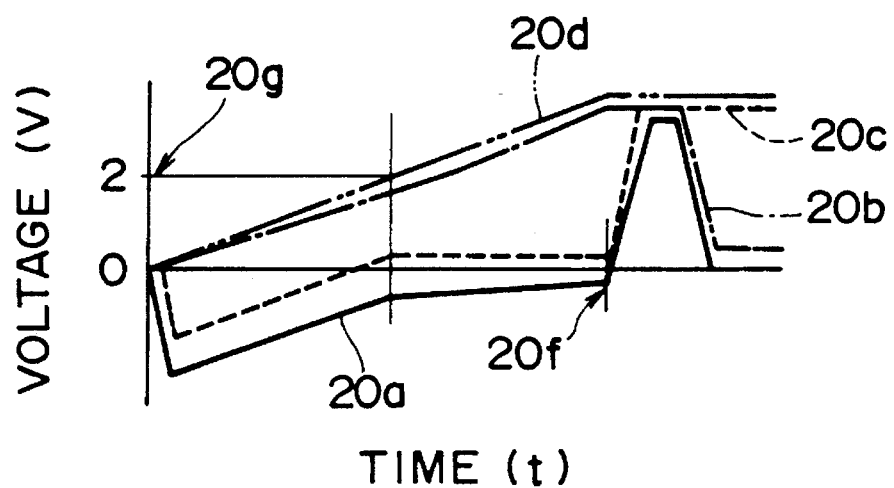
FIG. 16 is a graph showing the manner in which various voltages in the starter vary when the battery is charged from 0 volt and the charging is stopped before the battery is relieved of overcharging.

(j) Charging from a voltage lower than the Vgsoff voltage of the power NMOS transistor QC:

In FIGS. 15 and 16, the voltage 20a at the terminal VM drops, turning on the NMOS transistor Q12, whereupon the voltage 20c at the point b on FIG. 14 is drawn to a negative potential by the voltage 20a at the terminal VM. Since the cell voltage 20d is 0 V, the voltage 20b at the point a cannot increase beyond 0 V. The H-level signal from the charging logic circuit cannot increase beyond 0 V either. As a result, it is necessary to turn on the power NMOS transistor QC to start charging the cells by lowering the voltage 20a at the terminal VM to a value (power MOS transistor operating voltage 20g) at which the power MOS transistor QC starts to be turned on.

Figure 17:
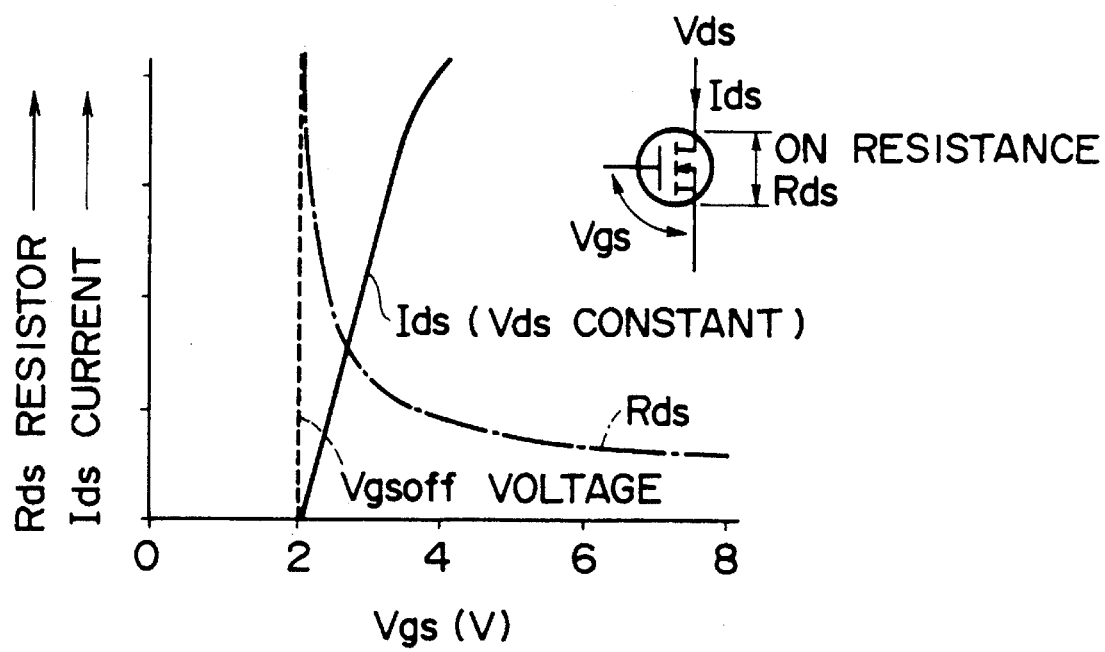
FIG. 17 is a graph representing characteristics of power MOS transistors.

Therefore, the power MOS transistor QC can be turned on when the voltage 20a at the terminal VM becomes negative by the voltage Vgsoff (e.g., 2 V) that is the voltage 20b at which the power MOS transistor QC can be turned The reason why the voltage 20a at the terminal VM needs to become negative by the voltage of 2 V is that the voltage of 2 V is of a value determined by the characteristics of the power NMOS transistors QC, QD. As shown in FIG. 17, while a gate-to-source voltage Vgs is lower than a certain voltage Vgsoff, a resistance Rds is of a very large value, and no current Ids flows.

Therefore, when the cells are charged from a voltage Vgsoff of 0 V, as shown in FIG. 16, the cell voltage 20d increases as the charging process goes on, substantially parallel to the voltage 20a at the terminal VM until it reaches 2 V. When the cell voltage 20d exceeds 2 V, the voltage 20a at the terminal VM approaches a negative value corresponding to a voltage drop of 0.7 V that is developed across the parasitic diode D1 of the power NMOS transistor QD in the forward direction.

When the charger is removed at 20f during the charging process with the cell voltage 20d being higher than 2 V and lower than the discharged voltage, as shown in FIG. 16, since the NMOS transistor Q12 is turned on, the voltage 20a at the terminal VM quickly goes up. As the terminal VM is connected to the source terminal of the NMOS transistor Q12, the voltage 20a rises closely up to the voltage at the terminal VDD, turning of the PMOS transistor Q11 and the NMOS transistor Q12, whereupon the voltage 20a at the terminal VM drops to 0 V.

(d) Total voltage detection:

When the cells are charged from the power-down mode, it is necessary to recover from the power-down mode after the cell voltage reaches a certain high value. This is because the battery protection circuit tends to operate in error if the power-down mode is canceled before reference voltages are established for overcharging detection, overdischarging detection, and overcurrent detection.

Figure 19:
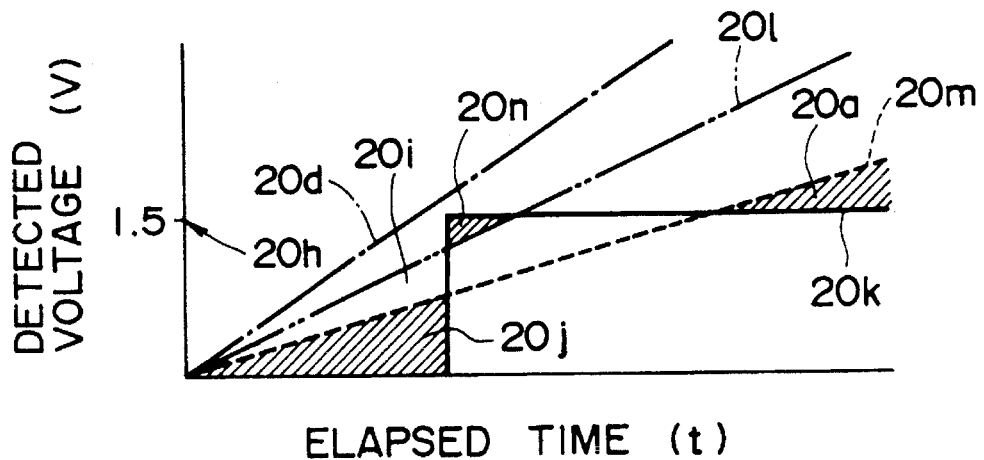
FIG. 19 is a graph of a reference voltage and detected overcharging and overdischarging regions, showing the manner in which the reference voltage rises quickly to a constant voltage.

Such an operation error poses no problem when various voltages are higher than a reference voltage 20 k, i.e., the reference voltages E1, E2 of 1.5 V. However, before the reference voltage 20 k, i.e., the reference voltages E1, E2 of 1.5 V, is established, as shown in FIG. 19, false detected results, i.e., a false normal region 20i and a false overcharging region 20j, are outputted.

Figure 18:
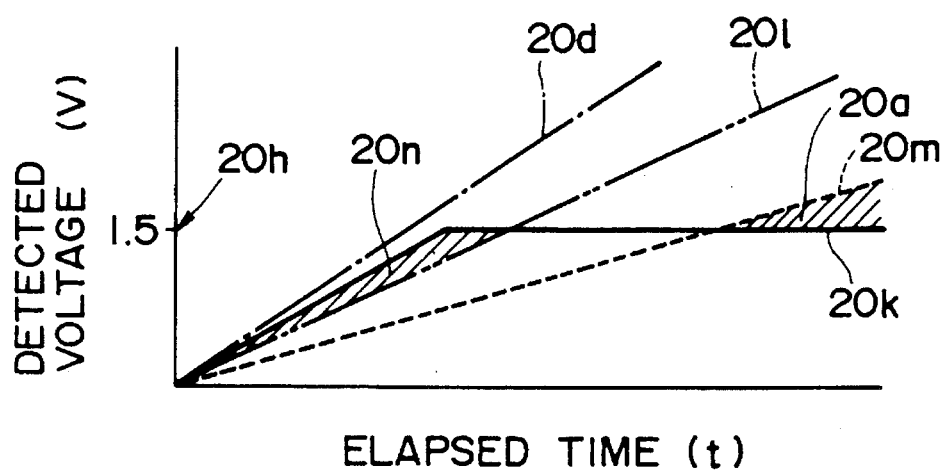
FIG. 18 is a graph of a reference voltage and detected overcharging and overdischarging regions, showing the manner in which the reference voltage rises with a battery voltage to a constant voltage.

If the reference voltages E1, E2, E3 are to be generated individually, the desired reference voltage 20 k can easily be produced as shown in FIG. 18.

Usually, a voltage from a reference power supply is distributed by operational amplifiers, thereby producing the reference voltages E1, E2, E3. Therefore, when the reference voltage is being established, operation errors such as the dummy normal region 20i and the dummy overcharging region 20j tend to occur (see FIG. 19). To avoid such operation errors, the power-down mode is canceled after the cell voltage 20d reaches a voltage that is high enough to establish and maintain a reference voltage value 20h.

The voltage 20k which is high enough to establish and maintain the reference voltage value 20h is required to be at least 3 V (the reference voltages E1+E2), and the range for detecting the voltage may be from 3 V (the reference voltages E1+E2) to 4 V (slightly lower than the overcharging voltage), if the reference voltage value 20h is 1.5 V. An actual circuit for detecting the voltage 20k is composed of the zener diode Z1, which is a constant-voltage diode, and the PMOS transistors Q1, Q2 as shown in FIG. 9.

Operation of the detecting circuit will be described below. The PMOS transistor Q2 is turned on by an L-level signal that is generated by the starter when the charging process is started, allowing a current to flow through the resistor R2 and the zener diode Z1. A voltage drop developed across the resistor R2 turns on the PMOS transistor Q1, and a signal is applied to the AND gate G8, forcibly canceling the power-down mode.

If the cell voltage 20d is lower than 3 V, then no current flows through the zener diode Z1, and hence the PMOS transistor Q1 remains de-energized. A voltage required to cancel the power-down mode is {(the voltage of the zener diode Z1)+(the voltage Vgsoff of the PMOS transistor Q1)}.

For example, if the voltage Vgsoff of the PMOS transistor Q1 is 0.5 V, then the voltage required to cancel the power-down mode is 3.5 V.

Figure 20:
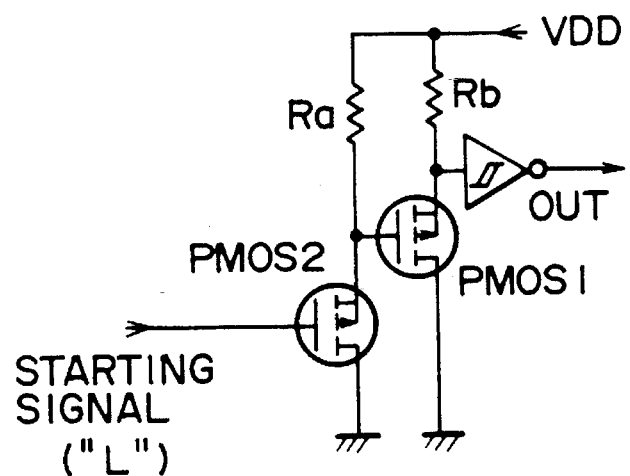
FIG. 20 is a circuit diagram of another circuit arrangement of a total voltage detecting circuit in the battery protection circuit shown in FIG. 9.

FIG. 20 shows a total voltage detecting circuit with no constant-voltage diode. The circuit arrangement shown in FIG. 20 detects a total voltage with only the voltage Vgsoff of the MOS transistor. The number of transistor stages may be increased as required.

(1) Time constants T1, T2:

While a load is being connected between the positive and negative terminals Eg+, Eb−, a constant current lower than a rated current may not necessarily flow from the battery at all times, but a current higher than the rated current may instantaneously flow from the battery.

For example, a current flowing through a smoothing capacitor or when a motor is started may reach several tens of amperes. If such an instantaneous current triggers the overcurrent protection function or the power-down mode, then the battery protection circuit cannot be used continuously, resulting in a practical disadvantage.

Figure 21:
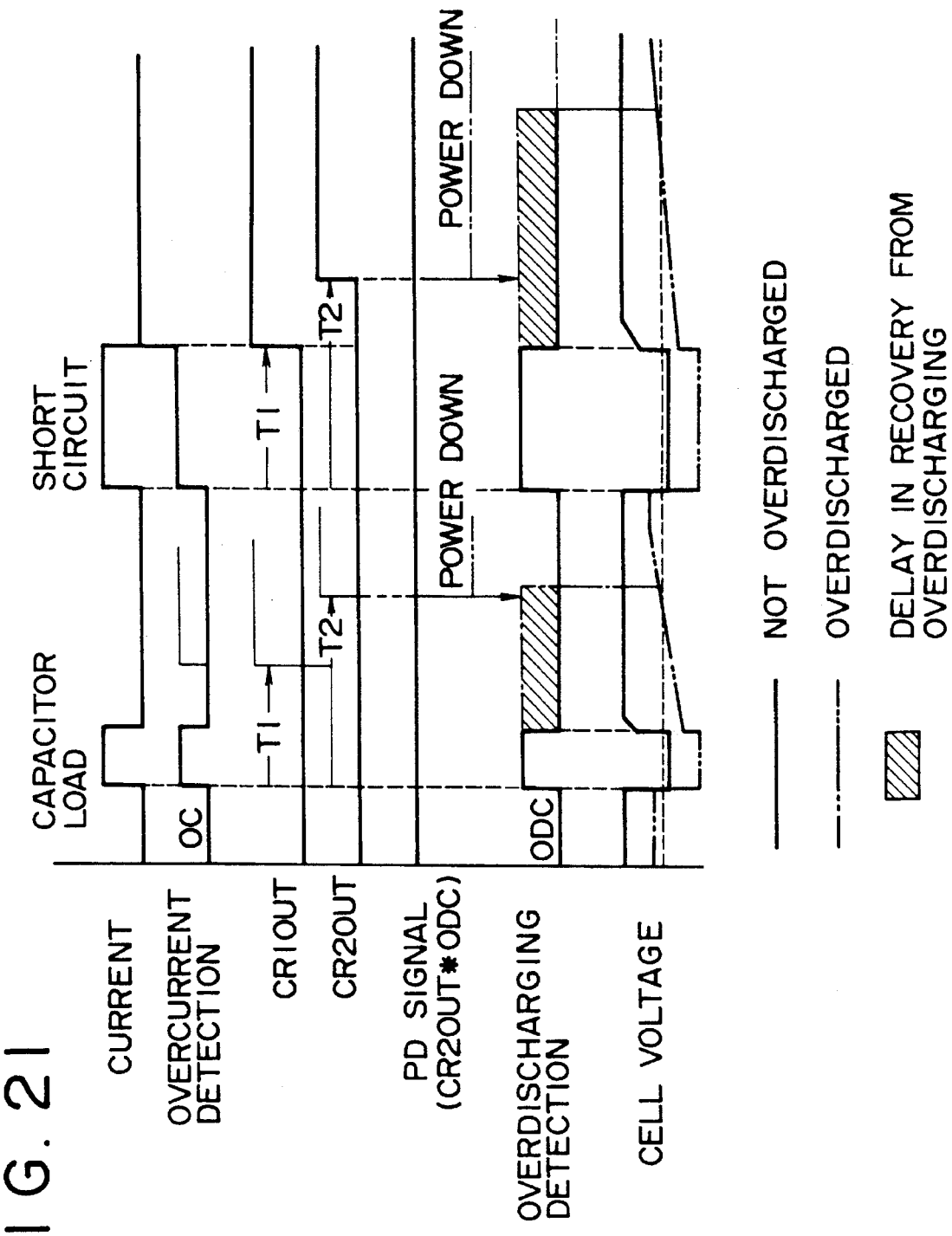
FIG. 21 is a timing chart showing time constants T1, T2 as well as other signals in the battery protection circuit shown in FIG. 9.

Therefore, it is necessary to disregard overdischarging and overcurrent if they exist for less than a certain interval of time. Such a requirement can be met by delaying action by time constants T1, T2 upon detection of overdischarging and overcurrent (see FIG. 9). The time constants T1, T2 are combined with the logic circuit so that each of the detecting circuits has a time constant, and the detecting circuits operate with the timing shown in FIG. 15. Operation will be described below with reference to FIGS. 9 and 21.

If the duration of a large current flowing through a capacitive load connected between the positive and negative terminals Eb+, Eb− is within the time interval of the time constant T1, then since an OC signal (L-level signal) produced by overcurrent detection is not produced, the signal from the time constant circuit CR1 remains at an L level, and the overcurrent protection function is not performed. If a large current flows and the cell voltage drops, resulting in a false overdischarged condition, then as long as the time required for recovery from the overdischarged condition is within the time interval T1 of the time constant circuit CR1, the signal from the time constant circuit CR1 remains at an L level, and no problem occurs.

If the time interval between the time when a large current is eliminated and the voltage is restored is longer than the time interval T2 of the time constant circuits CR1, CR2, then it is necessary to enter the power-down mode because the condition detected is as an overcharged condition. More specifically, an H-level signal is outputted from the time constant circuit CR1, turning off the power NMOS transistor QD. The level of the output signal from the time constant circuit CR2 becomes an H level in the time interval T2–T1 to which the time constant circuit CR2 is set. At this time, if the ODC signal from the overdischarging detecting circuit is of an H level indicating an overdischarged condition, then the battery protection circuit enters the power-down mode.

If the positive and negative terminals Eb+, Eb− are short-circuited, then the overcurrent circuit operates to produce an H-level OC current. After elapse of the time interval T1 of the time constant circuit CR1, the time constant circuit CR1 outputs an H-level signal, turning off the power NMOS transistor QD to protect the cells from the overcurrent.

Even if a false overcharged condition is detected during the time interval T1 of the time constant circuit CR1, no power-down mode is initiated if voltage recovery after the current is cut off takes place within the time interval T2 of the time constant circuit CR2.

When the battery is nearly overdischarged, voltage recovery may be delayed, and the battery protection circuit may enter the power-down mode. When the load is removed, the normal condition is resumed if the system is not in the power-down mode. The time interval T2–T1 of the time constant circuit CR2 is determined based on the recovery time of the cells. Usually, the time intervals T1, T2 are determined to satisfy the relationship T1<T2.

In the fourth embodiment, charging and discharging terminals may also be separate from each other to prevent faults upon charging and discharging as with the third embodiment.

(5) 5th embodiment:

A battery protection circuit according to a fifth embodiment of the present invention will be described below with reference to FIG. 22. The battery protection circuit according to the fifth embodiment is controlled by a microcomputer, and shown in block form in FIG. 22. Operation of the battery protection circuit according to the fifth embodiment is controlled by a control sequence shown in FIGS. 23 through 25.

Figure 22:
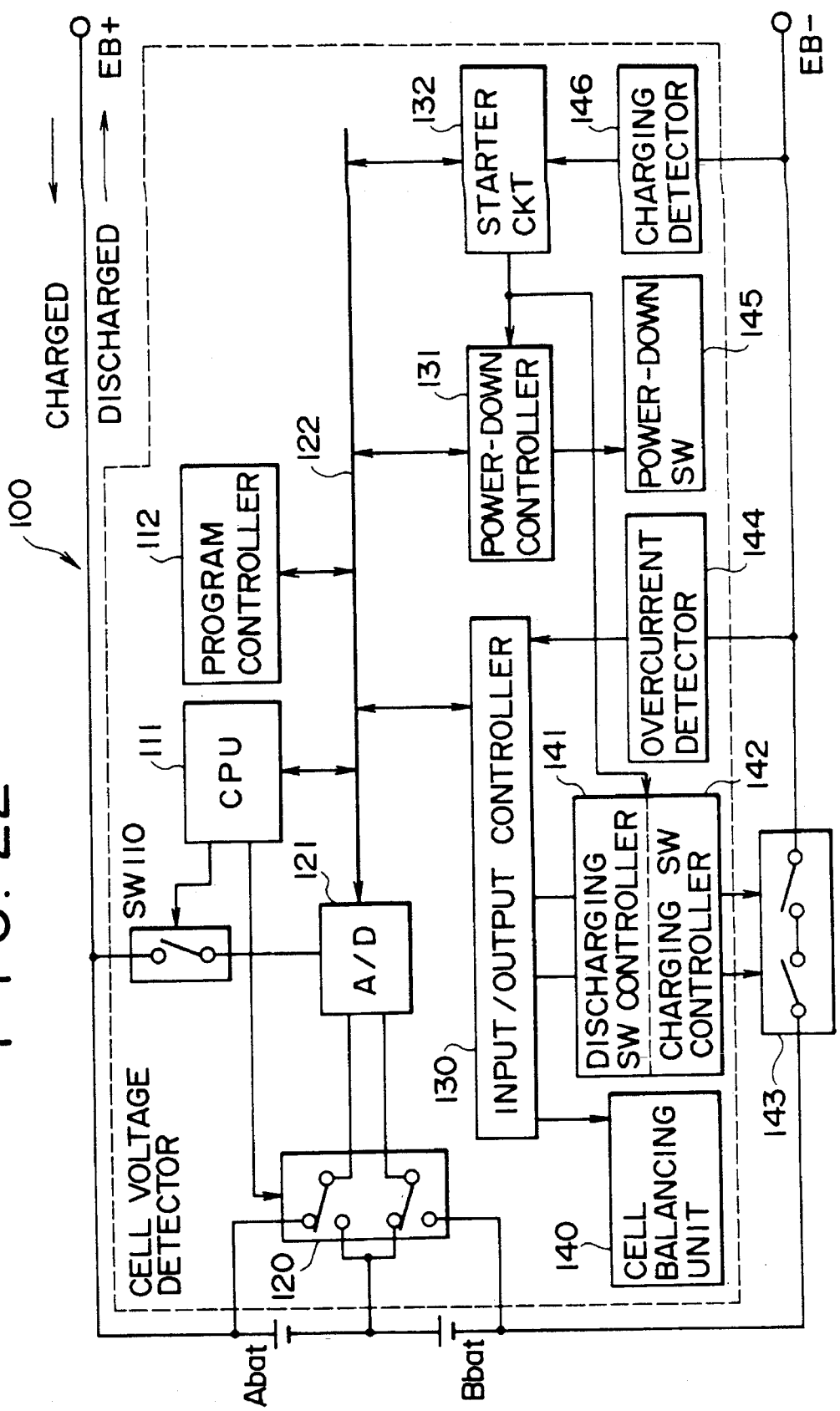
FIG. 22 is a block diagram of a battery protection circuit according to a fifth embodiment of the present invention.

<1> Circuit arrangement of the 5th embodiment:

FIG. 22 shows in block form a microcomputer-controlled battery protection circuit according to the fifth embodiment.

The positive terminal of a cell Abat is connected to a positive terminal Eb+, the positive terminal of a cell Bbat is connected to the negative terminal of the cell Abat, and the negative terminal of the cell Bbat is connected through a charging/discharging switch 143 to a negative terminal Eb−. A terminal of an analog switch SW110 and a terminal of a cell voltage detector 120 are connected between the positive terminal Eb+ and the positive terminal of the cell Abat. One terminal of the charging/discharging switch 143 is connected to the negative terminal of the cell Bbat. A terminal of an overcurrent detector 144 and a terminal of a charging detector 146 are connected between the other terminal of the charging/discharging switch 143 and the negative terminal Eb−. The charging/discharging switch 143 is connected to a discharging switch controller 141 and a charging switch controller 142.

A central processing unit (CPU) 111 is connected to a control terminal of the analog switch 110 and the cell voltage detector 120, and also to a bus line 122. To the bus line 122, there are connected an A/D converter 121, a program controller 112, an input/output controller 130, a power-down controller 131, and a starter circuit 132.

The CPU 111 and peripherals are arranged to have a low power requirement for low current consumption. Since responses with which the cell voltage detector 3 detects overcharging and overdischarging may be very slow (several msec. to several tens of msec.), the cell voltage detector 3 may use a clock signal of a low frequency which may range from several Hz to several tens of Hz, for example. The overcurrent detector 144 is however required to detect an overcurrent with a relatively fast response. Since use of the CPU 111 makes it possible to easily recognize various conditions of the battery, a display unit may be connected to display a remaining capacity, overcharging, etc. The display unit may comprise a liquid crystal display of low power requirement. If no display unit is mounted on a battery pack itself, then condition signals may be outputted through a connector for display on a device that is connected as a load to the battery.

The A/D converter 121 is supplied with power from the other terminal of the analog switch SW1, and is connected to terminals of the cell voltage detector 120 for detecting a cell voltage. The A/D converter 121 sends digital data to and receives digital data from the CPU 111 over the bus line 122.

The program controller 122 stores a program for operating the battery protection circuit, and sends the program over the bus line 122 to the CPU 111 based on commands from the CPU 111.

The input/output controller 130 is connected to the a cell balancing unit 140, the discharging switch controller 141, the charging switch controller 142, and the overcurrent detector 144, and sends required data to and receive required data from the cell balancing unit 140, the discharging switch controller 141, the charging switch controller 142, and the overcurrent detector 144 over the bus line 122 based on commands from the CPU 111.

Figure 23A:
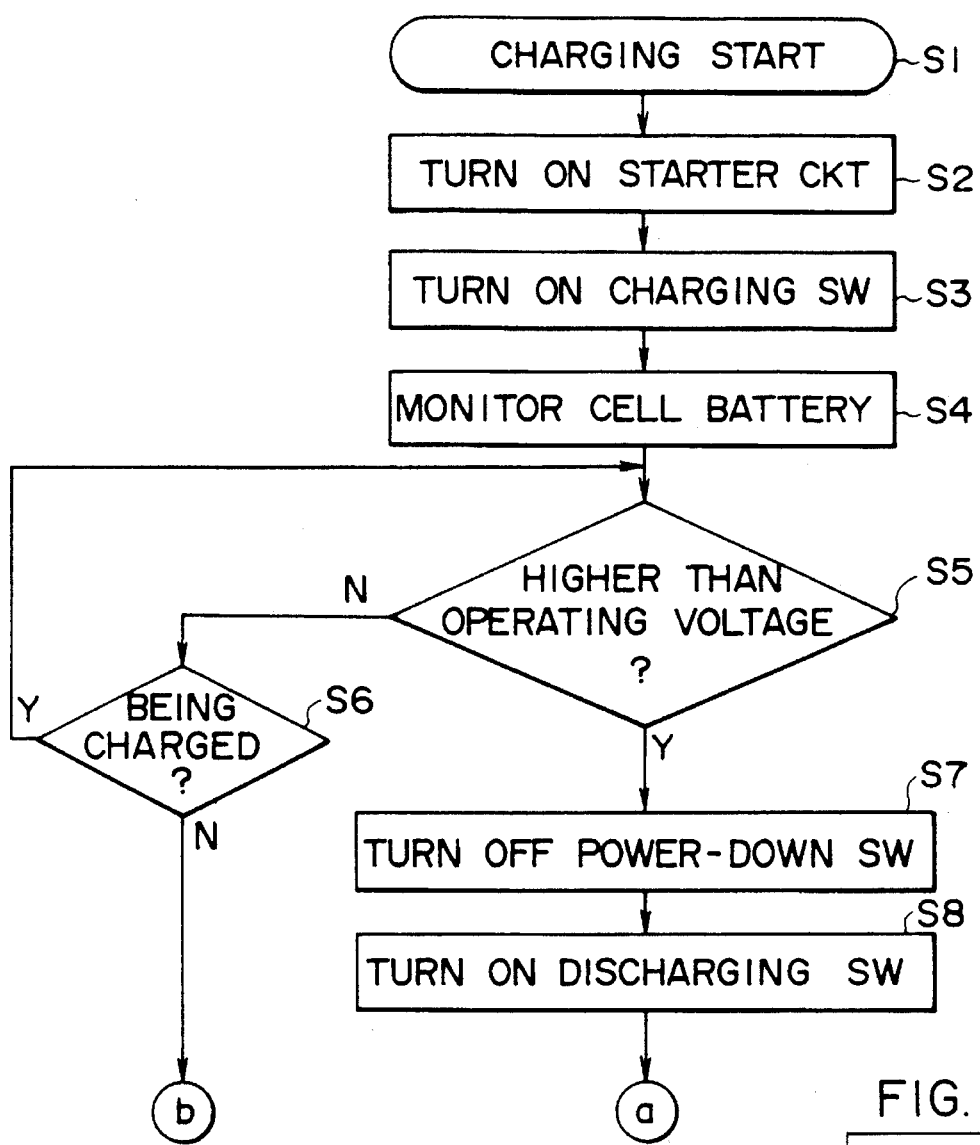
FIG. 23 is a flowchart of an operation sequence of the battery protection circuit according to the second embodiment.
Figure 23B:
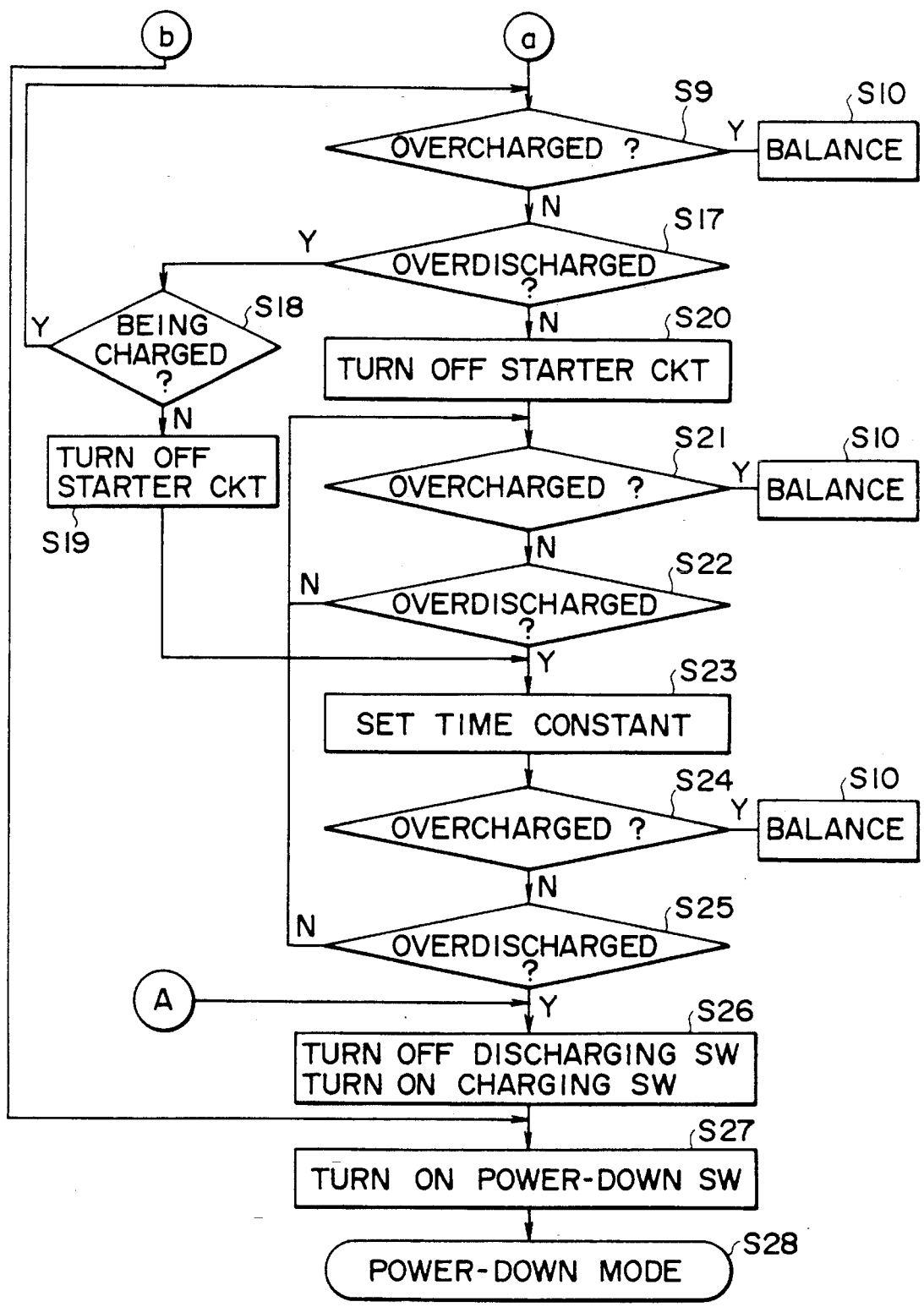

<2> Operation of the 5th embodiment:

Operation of the battery protection circuit shown in FIG. 22 will be described below with reference to FIGS. 23 through 25. A charging starting command is transmitted from the CPU 111 over the bus line 122 to the input/output controller 130 and the starter circuit 132 in steps S2, S3, and a charging starting signal is sent from the input/output controller 130 to the charging switch controller 142, which turns on a charging switch of the charging/discharging switch 143 to start charging the cells Abat, Bbat in a step S3.

The cells Abat, Bbat now start being charged, and the charged condition of the cells Abat, Bbat is detected by the cell voltage detector 120. The detected analog voltages of the cells Abat, Bbat are converted by the A/D converter 121 into digital values, which are supplied over the bus line 122 to the CPU 111 in a step S4. The CPU 111 compares the voltages with a predetermined operating voltage value.

If the charged voltages of the cells are lower than the operating voltage value and the cells are being charged in steps S5, S6, then the CPU 111 continuously compares the charged voltages with the operating voltage value. If the cells are not being charged, then the CPU 111 sends a power-down mode command over the bus line 122 to the power-down controller 131 to enter a power-down mode in steps S27, S28.

If the charged voltage of the cell becomes higher than the operating voltage value in the step S5, then a power-down switch is turned off in a step S7 and the charging switch is turned on in step S8. If the cell voltage detector 120 detects an overcharged condition in a step S9, then the CPU 111 applies cell balancing control signals through the input/output controller 130 to the cell balancing circuit 140, to balance the cells Abat, Bbat in a step S10.

Figure 24:
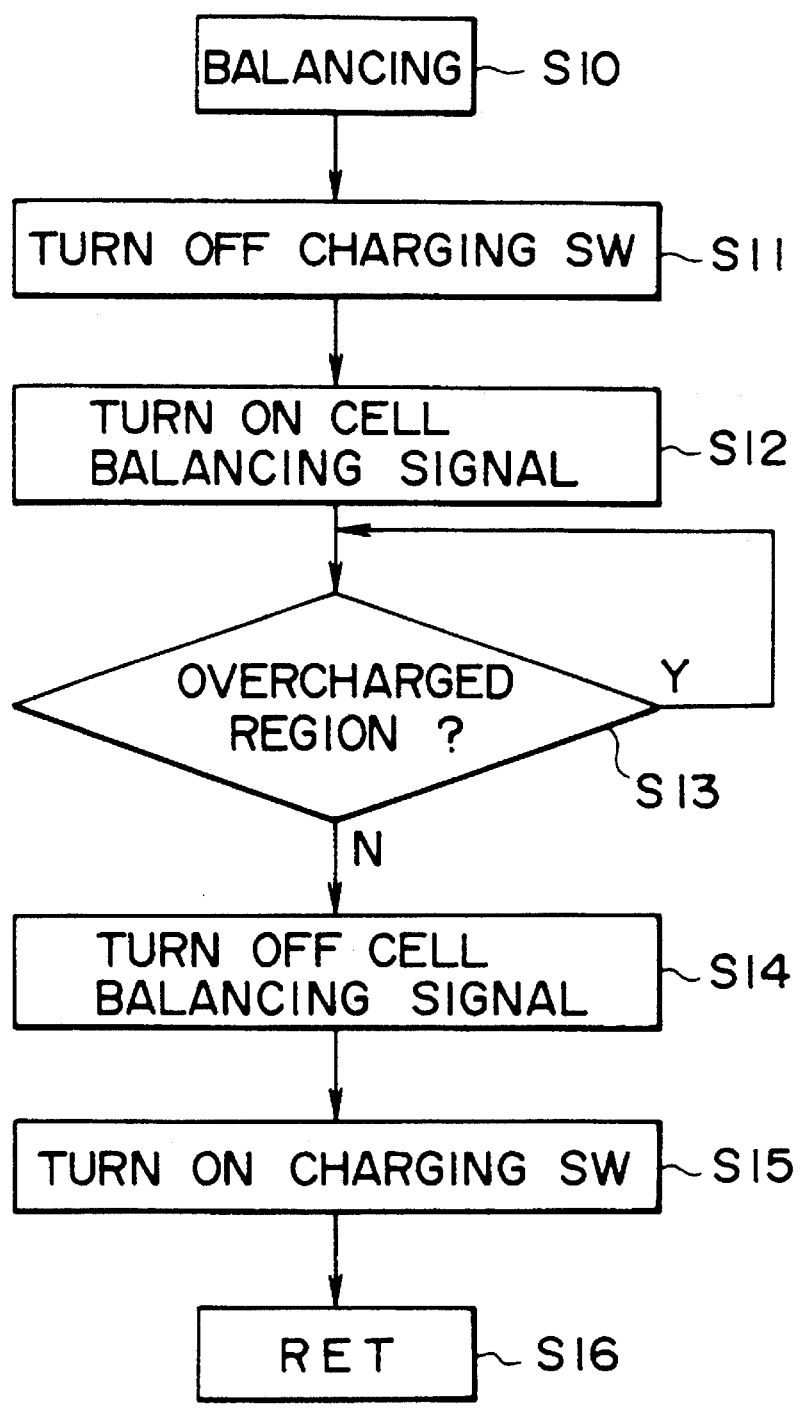
FIG. 24 is a flowchart of a cell balancing operation sequence of the battery protection circuit according to the fifth embodiment.

As shown in FIG. 24, a balancing process for each of the cells Abat, Bbat is controlled by the cell balancing unit 140. The CPU 111 instructs the input/output controller 130 to control the charging switch controller 142 to turn off the charging switch of the charging/discharging switch 143 in a step S11, thus stopping the charging process. The CPU 111 then turns on a signal indicating that each of the cells Abat, Bbat is being balanced in a step S12. The CPU 111 discharges those cells which are in an overcharged region to balance the cells in a step S13, and then turns off the signal indicating that each of the cells Abat, Bbat is being balanced in a step S14. The CPU 111 turns on the charging switch in a step S15, after which control returns at a step S16 to the main routine shown in FIG. 23 to start the charging process.

If the cells are not overcharged in the step S9, but overdischarged in a step S17 and being charged in a step S18, then the CPU 111 waits until the cell is overcharged while the overcharged condition is being detected. If the cells are not being charged, the CPU 111 turns off the starter circuit 132 in a step S19, and then control goes to a step S23.

If the cells are not overdischarged in the step S17, the CPU 111 turns off the starter circuit 132, cancels the power-down mode, and supplies a predetermined voltage to the load in a step S20. Accordingly, the microcomputer-controlled battery protection circuit can protect the battery from overcharging and overdischarging as with the battery protection circuit according to the fourth embodiment.

The cell voltage detector 100 monitors the cell voltages to detect overdischarging and overcharging conditions in steps S21, S22, and the detected voltages are compared with the operating voltage by the CPU 111. If an overcharging condition is detected, then the cells are balanced by the cell balancing unit 140 in the step S10.

If an overdischarged condition is detected, the CPU 111 sets a time constant in a step S23, and then determines whether the cells are really overcharged or only an instantaneous large current flows through the cells in a step S24. If the cells are really overcharged, then the cells are balanced by the cell balancing unit 140 in the step S10. If the cell is not overcharged in the step S24 but is overdischarged in a step S25, then the CPU 111 controls the input/output controller 130 to turn off the discharging and charging switches of the charging/discharging switch 143 in a step S26, and gives a power-down mode command to the power-down controller 131 in a step S27. The power-down controller 131 then turns on a power-down switch 145 to enter the power-down mode in a step S28. In the power-down mode, the CPU 111 turns on the analog switch SW1, and turns off the power supply of the A/D converter 121 and other circuits equivalent to those described in the other embodiments.

Figure 25:
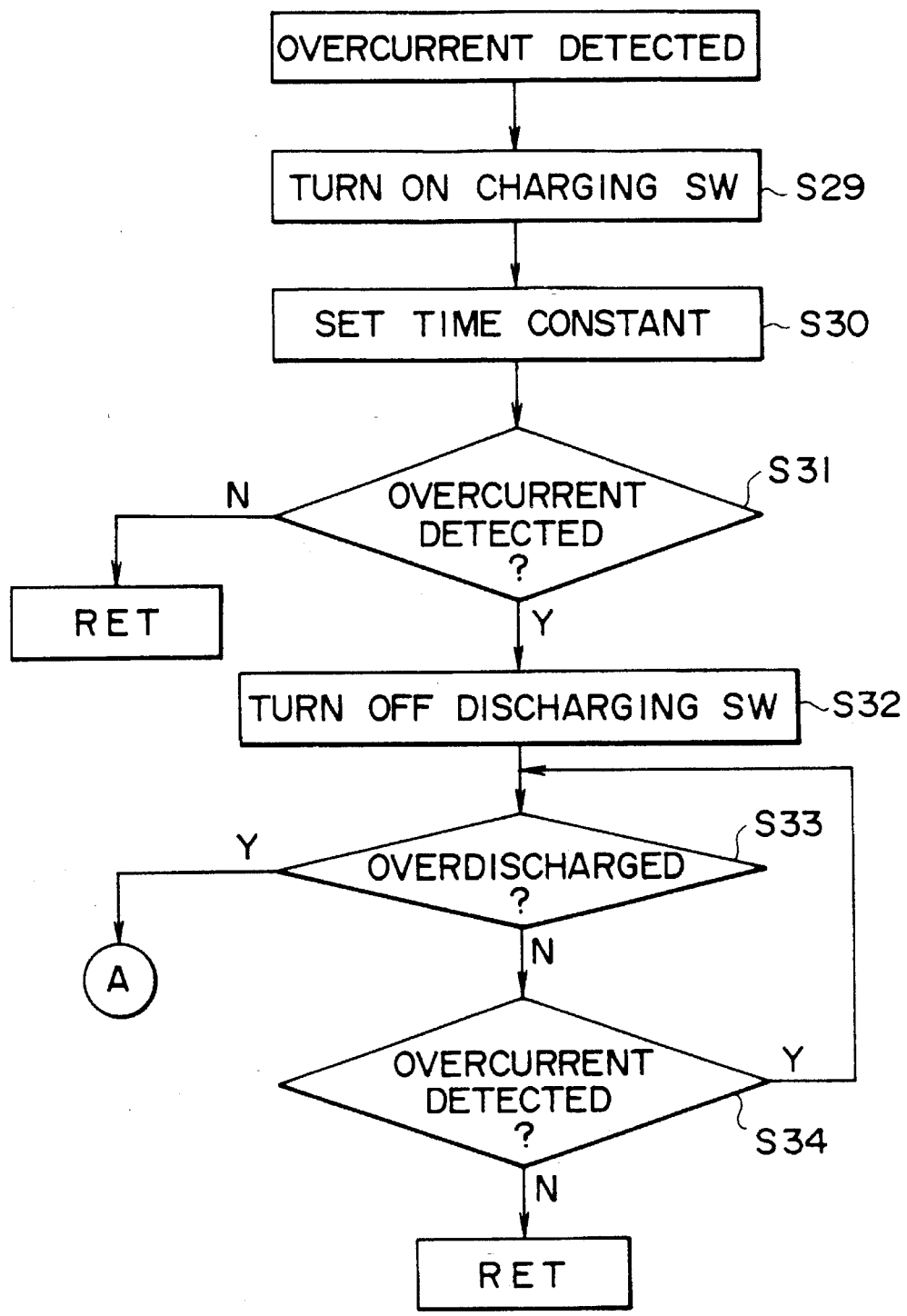
FIG. 25 is a flowchart of an overcurrent detecting operation sequence of the battery protection circuit according to the fifth embodiment.

In response to a signal indicative of a detected overcurrent from the overcurrent detector 144, the CPU 111 interrupts the main routine, and initiates an overcurrent interrupt process as shown in FIG. 25. When an overcurrent interrupt occurs, the CPU 111 controls the input/output controller 130 to enable the discharge switch controller 141 to turn on the discharging switch in a step S29, and sets a time constant in a step S30. If the period of a detected overcurrent is shorter than the time interval of the time constant in step S31, then the CPU 111 determines that an instantaneous large current flows through the cells, and maintains the present condition. If the period of a detected overcurrent is longer than the time interval of the time constant in the step S31, then the CPU 111 determines that an overcurrent occurs, and turns off the discharging switch in a step S32. If the cells are overdischarged in a step S33, then the CPU 111 controls the battery protection circuit to enter the power-down mode.

If the cells are not overdischarged in the step S33, but an overcurrent is detected in a step S34, then control returns to the main routine after waiting for the elimination of the overcurrent.

The battery protection circuits according to the present invention offer the following advantages:

Since the current consumed by the circuit is greatly reduced by entering the power-down mode upon overdischarging, the period of time in which the remaining capacity of the battery maintains the load can be extended. Thus, any overdischarged condition of the battery is suppressed to prevent the battery performance from being degraded.

The power-down mode canceling means is employed to automatically restoring the battery protection circuit from the power-down mode to the normal condition. This allows the battery protection circuit to be handled with ease.

If the battery is composed of series-connected secondary cells, the detection of an overdischarged condition can be effected with respect to one or all of the secondary cells for entering the power-down mode, and the power-down mode may be initiated in view of the balanced condition of the cells for preventing the cell performance from being degraded for an extended service life of the battery.

Even if the voltage across any of the secondary cells is 0 V in the power-down mode, it can automatically be charged by the forced charging means after the cell has been left unused for a long period of time.

A power-down mode inhibiting means that is energizable under certain conditions is employed to minimize mutual action of the cells to reduce performance degradation of each of the cells.

The battery protection circuit is prevented from entering the power-down mode by an instantaneous large current. Therefore, the battery protection circuit can be used continuously while avoiding operation errors which would otherwise be caused by external instantaneous fluctuations or disturbances such as load fluctuations or short circuits.

The means for balancing the secondary cells upon overcharging and overdischarging can equalize charging and discharging of the cells for a longer service life of the cells.

The charging and discharging terminals are separate from each other to prevent faults upon charging and discharging.

The power-down canceling means in the battery protection circuit with the power-down means restores the power-down switch means to a conductive condition after the voltage of the secondary cells exceeds a predetermined voltage, thereby preventing overcharging and overdischarging detection from being subject to errors.

When the cells start being charged again from an overdischarged condition, the power-down mode canceling means restores the power-down switch means from a nonconductive condition to a conductive condition to effect a quick charge even in the power-down mode.

With the secondary cells connected in series with each other, the power-down means renders the power-down switch means nonconductive when an overdischarged condition of one or all of the secondary cells is detected by the condition detecting means, so that all the connected secondary cells can be matched to each other.

When an instantaneous large current flows, the detection of a voltage drop across the battery is delayed, reliably preventing the battery protection circuit from entering the power-down mode in error.

If either one of the secondary cells is overcharged, then the power-down mode inhibiting means holds the power-down switch means conductive, with the result that an overcharged cell and an overdischarged cell can quickly be brought into balance with each other.

If the power-down switch means is nonconductive and the voltage of the secondary cells is about 0 V, then the forced charging means makes the secondary cells chargeable from 0 V.

Although certain preferred embodiments of the present invention has been shown and described in detail, it should be understood that various changes and modifications may be made therein without departing from the scope of the appended claims.

What is claimed is:

1. A battery protection circuit comprising:

a secondary cell formed of a plurality of sub-cells that are connected in series with each other;

condition detecting means connected to said secondary cell formed of said plurality of sub-cells for detecting a voltage across said secondary cell formed of said plurality of sub-cells and comparing the detected voltage with a reference voltage to detect an overdischarged condition or an overcharge condition of said secondary cell formed of said plurality of sub-cells;

first switch means for cutting off a discharging current;

second switch means for cutting off a charging current;

control means connected to said condition detecting means and to said first and second switch means for controlling said first and second switch means based on a detected condition detected by said condition detecting means;

third switch means for cutting off electric power supplied to said condition detecting means;

power-down mode means connected to said condition detecting means and said third switch means for rendering said third switch means nonconductive when the overdischarged condition is detected by said condition detecting means whereby said third switch means is rendered conductive when the voltage of the secondary cell detected by the condition detecting means exceeds a predetermined value after the secondary cell formed of said plurality of sub-cells has been in the overdischarged condition; and means for adjusting cell charge levels controlled by said condition detecting means to equalize the charge levels of said plurality of sub-cells.

2. A battery protection circuit according to claim 1, wherein said power-down mode means comprises means for rendering said third switch means nonconductive when the overdischarged condition of one or all of said plurality of sub-cells is detected by said condition detecting means.

3. A battery protection circuit according to claim 2, further comprising power-down mode inhibiting means connected to said condition detecting means and said power-down mode means for holding said third switch means conductive if any of said plurality of sub-cells is in the overcharged condition as detected by said condition detecting means.

4. A battery protection circuit according to claim 1, further comprising voltage drop preventing means connected to said condition detecting means and said power-down mode means for holding said third switch mens conductive for a first time interval if the voltage detected across said secondary cell formed of said plurality of sub-cells drops below an overdischarged voltage for a second time interval shorter than the first time interval due to a momentary large current flowing through said secondary cell formed of said plurality of sub-cells.

5. A battery protection circuit according to claim 2, further comprising voltage drop preventing means connected to said condition detecting means and said power-down mode means for holding said third switch means conductive for a first time interval if the voltage detected across said plurality of sub-cells drops below an overdischarged voltage for a second time interval shorter than the first time interval due to a momentary large current flowing through said plurality of sub-cells.

6. A battery protection circuit according to claim 2, further comprising charging and discharging terminals which are connected to said plurality of sub-cells and which are separate from each other.

* * * * *